United States Patent
Singh et al.

(10) Patent No.: US 7,587,110 B2
(45) Date of Patent: Sep. 8, 2009

(54) MULTICORE OPTICAL FIBER WITH INTEGRAL DIFFRACTIVE ELEMENTS MACHINED BY ULTRAFAST LASER DIRECT WRITING

(75) Inventors: Rajminder Singh, Shrewsbury, MA (US); Satoshi Yamauchi, Shrewsbury, MA (US); Ming Li, Chelmsford, MA (US); Jimmy Yi-Jie Jia, Cambridge, MA (US); Tetsuo Ohara, Sutton, MA (US); Xinbing Liu, Acton, MA (US)

(73) Assignee: Panasonic Corporation, Osaka (JP)

( * ) Notice: Subject to any disclaimer, the term of this patent is extended or adjusted under 35 U.S.C. 154(b) by 434 days.

(21) Appl. No.: 11/086,890

(22) Filed: Mar. 22, 2005

(65) Prior Publication Data

US 2006/0215976 A1 Sep. 28, 2006

(51) Int. Cl.
*G02B 6/26* (2006.01)

(52) U.S. Cl. .......................... 385/126; 385/39

(58) Field of Classification Search .......... 385/123–127
See application file for complete search history.

(56) References Cited

U.S. PATENT DOCUMENTS

| | | | | |
|---|---|---|---|---|
| 4,436,368 A | * | 3/1984 | Keck | 385/127 |
| 4,494,968 A | * | 1/1985 | Bhagavatula et al. | 65/386 |
| 4,877,300 A | * | 10/1989 | Newhouse et al. | 385/43 |
| 4,911,516 A | | 3/1990 | Palfrey et al. | 385/37 |
| 5,600,665 A | * | 2/1997 | Minden et al. | 372/6 |
| 5,848,204 A | | 12/1998 | Wanser | 385/12 |
| 5,920,582 A | * | 7/1999 | Byron | 372/6 |
| 6,195,483 B1 | | 2/2001 | Moon et al. | 385/37 |
| 6,229,939 B1 | | 5/2001 | Komine | 385/29 |
| 6,282,341 B1 | | 8/2001 | Digonnet et al. | 385/37 |
| 6,301,422 B1 | * | 10/2001 | Li | 385/127 |
| 6,321,007 B1 | * | 11/2001 | Sanders | 385/37 |
| 6,343,176 B1 | * | 1/2002 | Li et al. | 385/127 |
| 6,347,171 B1 | | 2/2002 | Tatah et al. | |
| 6,360,031 B1 | * | 3/2002 | Harrah | 385/12 |
| 6,404,966 B1 | * | 6/2002 | Kawanishi et al. | 385/125 |
| 6,415,079 B1 | * | 7/2002 | Burdge et al. | 385/37 |
| 6,487,340 B2 | * | 11/2002 | Enomoto et al. | 385/37 |
| 6,525,872 B1 | * | 2/2003 | Ziari et al. | 359/341.3 |

(Continued)

OTHER PUBLICATIONS

K. O. Hill et al.; Photosensitivity in Opitcal Fiber Waveguides: Application to Reflection Filter Fabrication; Applied Physics Letters 32(10). pp. 647-649, May 1978.

(Continued)

*Primary Examiner*—Frank G Font
*Assistant Examiner*—Peter Radkowski
(74) *Attorney, Agent, or Firm*—RatnerPrestia

(57) ABSTRACT

A multicore optical fiber with an integral diffractive element. The multicore optical fiber includes: a first optical fiber core formed of a non-photosensitive material having an initial index of refraction; and a second optical fiber core including a second longitudinal core axis substantially parallel to the first longitudinal axis. The first optical fiber core includes: a first longitudinal core axis; and a number of index-altered portions having an altered index of refraction which is different from the initial index of refraction. The index-altered portions are arranged within the non-photosensitive material of the first optical fiber core to form a diffractive structure of the integral diffractive element.

31 Claims, 13 Drawing Sheets

U.S. PATENT DOCUMENTS

| | | | | |
|---|---|---|---|---|
| 6,647,191 | B2* | 11/2003 | Li | 385/127 |
| 7,080,529 | B2* | 7/2006 | Dowd et al. | 65/393 |
| 7,174,077 | B1 | 2/2007 | Howard | 385/123 |
| 7,203,399 | B2* | 4/2007 | Ishikawa et al. | 385/37 |
| 7,362,939 | B2* | 4/2008 | Tsuda et al. | 385/126 |
| 7,366,378 | B2* | 4/2008 | Jia et al. | 385/37 |
| 7,376,307 | B2* | 5/2008 | Singh et al. | 385/37 |
| 2002/0003926 | A1 | 1/2002 | Enomoto et al. | 385/37 |
| 2003/0138229 | A1 | 7/2003 | Paek et al. | 385/123 |
| 2004/0151430 | A1* | 8/2004 | Neuberger | 385/31 |
| 2004/0184734 | A1* | 9/2004 | Mihailov et al. | 385/37 |
| 2004/0252939 | A1* | 12/2004 | Gaylord et al. | 385/28 |
| 2006/0093012 | A1* | 5/2006 | Singh et al. | 372/102 |
| 2006/0215976 | A1* | 9/2006 | Singh et al. | 385/126 |
| 2006/0269201 | A1* | 11/2006 | Sezerman et al. | 385/123 |

OTHER PUBLICATIONS

Stephen J. Mihailov et al., Fiber Bragg gratings made with a phase mask and 800-nm femtosecond radiation, Optics Letters, Jun. 15, 2003, pp. 995-997, vol. 28, No. 12.

Eric Fertein et al., Refractive-index changes of standard telecommunication fiber through exposure to femtosecond laser pulses at 810 cm, Applied Optics, Jul. 20, 2001, pp. 3506-3508, vol. 40, No. 21.

Yun-Jiang Rao et al., Novel Fiber-Optic Sensors Based on Long-Period Fiber Gratings Written by High-Frequency $CO_2$ Laser Pulses, Journal of Lightwave Technology, May 2003, pp. 1320-1327, vol. 21, No. 5.

P.G. Kryukov et al., Long-period fibre grating fabrication with femtosecond pulse radiation at different wavelengths, www.sciencedirect.com.

Microelectronic Engineering, vol. 69, Issue 2-4, p. 248-255, (Sep. 2003).

\* cited by examiner

MULTICORE OPTICAL FIBER WITH INTEGRAL DIFFRACTIVE ELEMENTS MACHINED BY ULTRAFAST LASER DIRECT WRITING

FIELD OF THE INVENTION

The present invention relates generally to diffractive structures formed in multicore optical fibers by ultrafast laser direct writing. More particularly these structures may be Bragg gratings, long period Bragg gratings, photonic crystal structures, and/or diffractive optical elements formed within the cores of multicore optical fibers.

BACKGROUND OF THE INVENTION

A Bragg grating is a periodic or aperiodic perturbation of the effective absorption coefficient and/or the effective refractive index of an optical waveguide. More simply put, a Bragg grating can reflect a predetermined narrow or broad range of wavelengths of light incident on the grating, while passing all other wavelengths of the light. Such structures provide a desirable means to manipulate light traveling in the optical waveguide.

A fiber Bragg grating (FBG) is a Bragg grating formed in an optical fiber. FBG's may be formed from photo-imprinted gratings in optical fibers. Photo-imprinting involves the irradiation of an optical waveguide with a laser beam of ultraviolet light to change the refractive index of the core of the waveguide. By irradiating the fiber with an intensive pattern that has a periodic (or aperiodic) distribution, a corresponding index perturbation is permanently induced in the core of the waveguide. The result is an index grating that is photo-imprinted in the optical waveguide. This method requires that the glass be photosensitive, an effect discovered in 1978 by Dr. Kenneth Hill of the Communications Research Centre Canada.

The FBG may become a very selective spatial reflector in the core of the fiber. Any change to the spatial period of the grating, or index of refraction, causes a proportional shift in the reflected and transmitted spectrum. FBG's have proven attractive in a wide variety of optical fiber applications, such as: narrowband and broadband tunable filters; optical fiber mode converters; wavelength selective filters, multiplexers, and add/drop Mach-Zehnder interferometers; dispersion compensation in long-distance telecommunication networks; gain equalization and improved pump efficiency in erbium-doped fiber amplifiers; spectrum analyzers; specialized narrowband lasers; and optical strain gauges in bridges, building structures, elevators, reactors, composites, mines and smart structures.

Since their market introduction in 1995, the use of optical FBG's in commercial products has grown exponentially, largely in the fields of telecommunications and stress sensors. The demand for more bandwidth in telecommunication networks has rapidly expanded the development of new optical components and devices (especially Wavelength Division Multiplexers). FBG's have contributed to the phenomenal growth of some of these products, and are recognized as a significant enabling technology for improving fiber optic communications.

Photo-imprinted FBG's may have low insertion losses and are compatible with existing optical fibers used in telecommunication networks, but as the optical power being transmitted in a photo-imprinted FBG increases, some undesirable effects may arise. One drawback of photo-imprinted FBG's is the requirement that the optical fiber have a photosensitive core. Photosensitive materials typically have absorption coefficients higher than are desirable for high power applications, as well as potentially undesirable non-linearities that may become large at high optical powers. Photo-imprinted FBG's are also susceptible to degradation over time, particularly is the photosensitive material of the fiber core is heated or exposed to UV radiation.

In their article, FIBER BRAGG GRATINGS MADE WITH A PHASE MASK AND 800-NM FEMTOSECOND RADIATION (Optics Letters, Vol. 28, No. 12, pgs. 995-97 (2003)), Stephen J. Mihailov, et al. disclose a first order FBG formed in a single mode fiber using a femtosecond laser. The single mode fiber used was a standard SMG-28 telecommunications fiber with a non-photosensitive Ge doped core. The authors were able to form a first order Bragg grating structure in this core. This direct laser written single mode FBG was found to have superior thermal stability as compared to a photo-imprinted FBG.

Although the direct laser written single mode FBG of Stephen J. Mihailov, et al. may overcome many of the disadvantages of the photo-imprinted FBG's, the present invention includes a number of additional improvements that may provide superior performance, particularly at higher power levels, and increased versatility of the Bragg grating structures that may be formed. Additionally, the present invention includes the use of multicore optical fibers and additional diffractive structures that may be formed in these optical fibers to control and monitor light propagating in the fiber.

SUMMARY OF THE INVENTION

An exemplary embodiment of the present invention is a multicore optical fiber with an integral diffractive element. The multicore optical fiber includes: a first optical fiber core formed of a non-photosensitive material having an initial index of refraction; and a second optical fiber core including a second longitudinal core axis substantially parallel to the first longitudinal axis. The first optical fiber core includes: a first longitudinal core axis; and a number of index-altered portions having an altered index of refraction which is different from the initial index of refraction. The index-altered portions are arranged within the non-photosensitive material of the first optical fiber core to form a diffractive structure of the integral diffractive element.

Another exemplary embodiment of the present invention is a wavelength stabilized, high power, uncooled laser source. The wavelength stabilized, high power, uncooled laser source includes: at least one high power laser; and a multicore optical fiber optically coupled to the high power laser(s). The multicore optical fiber includes: a first optical fiber core formed of a non-photosensitive material having an initial index of refraction; and a second optical fiber core having a second index of refraction which is less than the first index of refraction of the first optical fiber core. The first optical fiber core includes: a first longitudinal core axis; a circular cylindrical shape; a first core radius; and a number of index-altered portions having an altered index of refraction which is different from the initial index of refraction. The second optical fiber core includes: a second longitudinal core axis substantially collinear with the first longitudinal axis; an annular cylindrical shape; an inner second core radius equal to the first core radius of the first optical fiber core; and an outer second core radius. The index-altered portions are arranged within the non-photosensitive material of the first optical fiber core to form a Bragg grating structure. The Bragg grating structure reflects a predetermined fraction of the light in a predetermined wavelength band which is propagating in the first optical fiber core back into the high power laser(s) to lock the output wavelength band of the wavelength stabilized, high power, uncooled laser source to the predetermined wavelength band.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

Figure 1A:
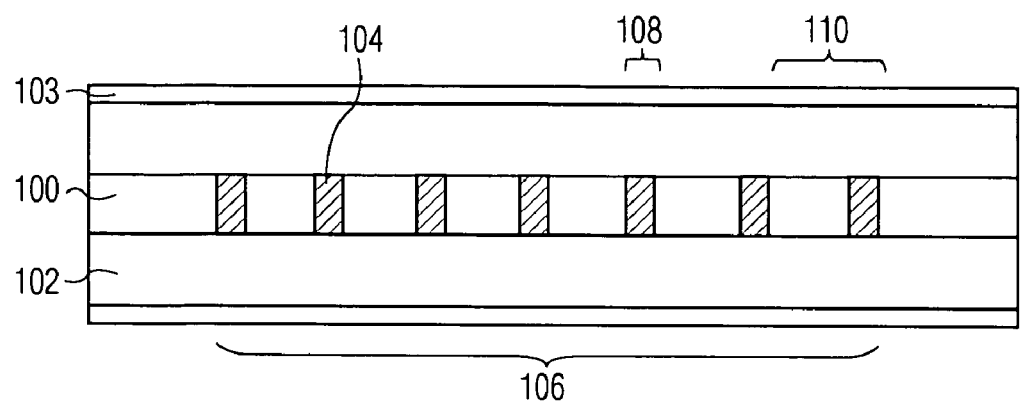
FIG. 1A is a cut-away side plan drawing illustrating an exemplary multicore fiber Bragg grating (FBG) according to the present invention cut along line 1A of FIG. 1B.

The extremely high intensities achievable in ultrafast laser machining of materials allow the material to be changed in a number of ways. The most common way that a material may be changed during ultrafast laser machining is for the material to be removed from the surface via ablation. Alternatively, various properties of the material may be changed such as the crystallinity and/or the refractive index. These material changes may occur on the surface of the material or, for substantially transparent materials, the ultrafast pulses may be focused within the material to cause these changes to take place inside of the bulk of the material. These internal changes may occur only above a specific fluence, so that the intervening material may be unaffected by the ultrafast laser pulses. Careful control of the pulse energy, pulse duration, and focus of the pulses may allow for the creation of precise regions with changed properties that have sharp boundaries.

Thus, the use of ultrafast lasers for direct writing of Bragg grating structures in optical fibers may have the advantage of providing sharp contrasts between index-altered portions of the fiber and surrounding unaltered portions of the fiber. Additionally, the use of an ultrafast laser machining system designed for direct writing of structures in optical fibers, such as the exemplary systems disclosed in U.S. provisional patent application ULTRAFAST LASER MACHINING SYSTEM FOR FORMING MULTIMODE LONG PERIOD FIBER BRAGG GRATING (Application No. 60/623,285), filed Oct. 29, 2004, allows for the creation complex structures within optical fibers, particularly in multimode and multicore optical fibers.

Such an ultrafast laser machining system may be focused to a small region within an optical fiber. The fluence of each pulse of laser light of this exemplary ultrafast laser machining system may be controlled such that only this small region near the beam spot is machined by the pulse. It is noted that the small region machined by a single pulse may be smaller than the beam waist of the spot. The optical fiber may be moved in three dimensions so that the beam spot of the laser pulses is scanned within in the optical fiber, tracking through the portions of the non-photosensitive material of the optical fiber to be machined. The location of the machined region may be viewed through a stereo imaging system throughout the machining process to allow for more accurate machining of the diffractive structure. In this manner, a complex diffractive structure may be written three dimensionally within an optical fiber with a high level of precision. For example, the diffractive structure may be formed only in one or more selected cores of a multicore optical fiber.

Single mode optical fiber cores are relatively small, typically less that 9 µm for telecommunication wavelengths. Multicore optical fibers may include a number of single mode cores as well as potentially including one or more multimode cores. The creation of diffractive structures within single mode optical fiber cores may require highly accurate and precise control of the beam spot of an exemplary ultrafast laser machining system. Multimode optical fiber cores, however, may have significantly more space for forming structures within the core. Typical multimode fiber core radii range from about 10 µm to about 200 µm, with 25 µm and 31.25 µm being the most common multimode fiber core radii for telecommunication wavelengths. The multiple modes utilized by light propagating in multicore optical fibers may lead to a large number of potential structural forms for controlling and monitoring light in these fibers.

Thus, applying ultrafast laser machining techniques to multicore optical fibers may create a significant expansion of the potential uses of direct laser written structures in optical fibers over the first order, single mode FBG's disclosed in Stephen J. Mihailov, et al.'s article.

Exemplary embodiments of the present invention include a number of diffractive structures formed within optical fibers such as: FBG's, long period FBG's (LPFBG's); optical fibers with integral photonic crystal sections and/or diffractive coupling optics; multicore optical fibers with multiple parallel optical fiber cores having diffractive structures to separately manipulate propagation of light in each core; and coaxial multicore optical fibers with FBG's formed in a central single mode optical fiber core. These modified multicore optical fibers may be useful in a variety of situations, including: wavelength stabilized, high power, uncooled laser sources; dispersion compensation applications; optical filters; and in many optical telecommunications applications to name a few.

Figure 1B:
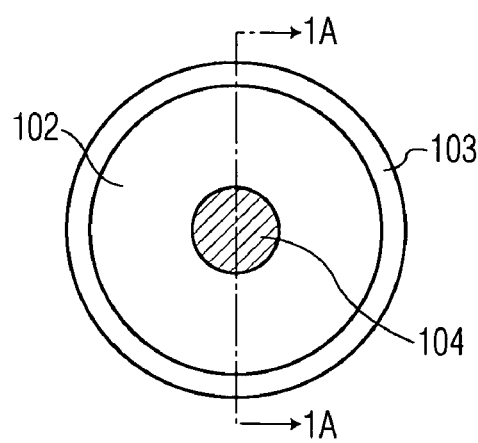
FIG. 1B is an end plan drawing illustrating the exemplary multicore FBG of FIG. 1A.

FIGS. 1A and 1B illustrate exemplary coaxial multicore FBG 106 designed for a predetermined wavelength band. The coaxial multicore fiber shown in FIGS. 1A and 1B includes inner optical fiber core 100, outer optical fiber core 102, and cladding layer 103. It is noted that coaxial dual core optical fibers have been selected in many of the Figures of the drawing, including FIGS. 1A-D, for illustrative purposes and this selection is not intended to be limiting. Coaxial multicore optical fibers having three or more optical fiber cores are also contemplated in the present invention.

Exemplary FBG 106 of FIGS. 1A and 1B is formed by a number of cylindrical index-altered portions 104 with substantially planar transmission surfaces located in inner optical fiber core 100. The Bragg grating structure formed by exemplary FBG 106 may be a single period Bragg grating structure or a long period Bragg grating structure. The transmission surfaces of each index-altered portion are substantially parallel, as are the facing transmission surfaces of neighboring index-altered portions. These index-altered portions have an index of refraction which has been altered, from the initial index of refraction of the non-photosensitive material of inner optical fiber core 100, desirably by selective irradiation of portions of the non-photosensitive material by pulses of ultrafast laser light.

Inner optical fiber core 100 is illustrated in FIG. 1B to have a circular cylindrical shape, including a substantially cylindrical surface, a longitudinal core axis, and a core radius. Outer optical fiber core 102 is illustrated in FIG. 1B to have an annular cylindrical shape formed on the substantially cylindrical surface of inner optical fiber core 100. One skilled in the art may understand that the cross-sectional shapes of these optical fiber cores are not restricted to such circularly symmetric shapes. Optical fiber cores having other cross-sectional shapes may be used in the present invention as well, including, but not limited to, solid or hollow elliptical, rectangular, and polygonal cores. Polarization maintaining optical fiber cores may be used as well.

In one exemplary embodiment, inner optical fiber core 100 may be a single mode optical fiber core. This exemplary embodiment may be particularly desirable to provide strong feedback of the single mode propagating in inner optical fiber core 100 while allowing the multiple modes propagating in outer optical fiber core 102 to be transmitted with reduced loss. For example, this exemplary embodiment may be particularly desirable in a high power laser wavelength locking system such as described below with reference to FIG. 14.

Inner optical fiber core 100 is desirably formed of a non-photosensitive material that has an index of refraction, which may be altered by high intensity, ultrafast laser irradiation. The fractional index change between inner optical fiber core 100 and index-altered portions 104 is dependent on the selection of the non-photosensitive material. Many materials exhibit a fractional index change between $10^{-5}$ and $10^{-3}$, with approximately $10^{-4}$ being typical, although it is noted that arsenic trioxide may exhibit a fractional index change as high as $10^{-2}$. Crystalline or semi-crystalline materials may also exhibit higher fractional index changes. In these materials the crystallinity of the index-altered portions 104 may be altered by the ultrafast laser machining, leading to a relatively higher fractional index change compared to non-crystalline materials. The non-photosensitive material of inner optical fiber core 100 may desirably include one or more of: fused silica; borosilicate; quartz; zirconium fluoride; silver halide; chalcogenide glass; optical plastic; clear fused quartz; aluminosilicate; polymethylmeth-acrylate; polystyrene; acrylic; and/or arsenic trioxide.

Figure 9:
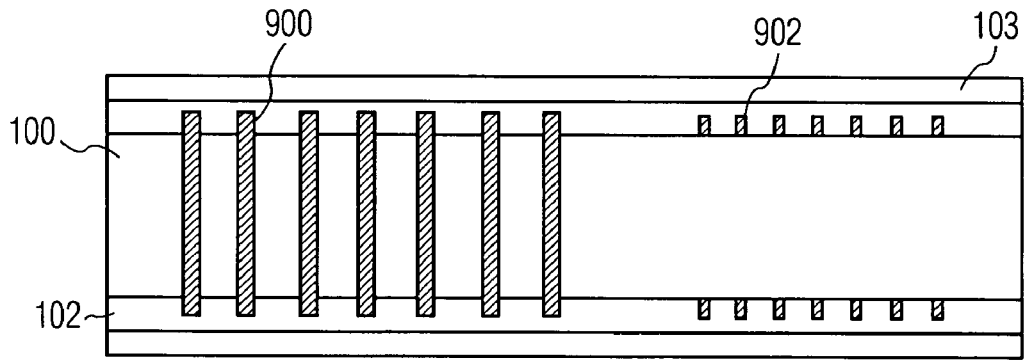
FIG. 9 is a cut-away side plan drawing of another exemplary multi-wavelength multicore FBG according to the present invention illustrating two alternative Bragg grating structures.

Outer optical fiber core 102 has an index of refraction that is desirably lower than the initial index of refraction of the non-photosensitive material of the multimode optical fiber core. Outer optical fiber core 102 may be formed of any material typically used for optical fiber cores, although it may be desirable to use a non-photosensitive material similar to the non-photosensitive material of inner optical fiber core 100, particularly if it is desired to form diffractive structures in outer optical fiber core 102, as shown in FIG. 9. Additionally, an exemplary coaxial multicore optical fiber having an integral diffractive structure of the present invention may desirably include cladding layer 103 formed on the outer surface of outer optical fiber core 102. This cladding layer may be formed of any material typically used for optical fiber cladding, although it may be desirable to use a non-photosensitive material similar to the non-photosensitive material of the optical fiber cores. It is noted that diffractive structures may also be formed in cladding layer 103.

Index-altered portions 104 of the exemplary Bragg grating structure shown in FIGS. 1A and 1B have constant longitudinal thickness 108 and constant longitudinal pitch 110. Longitudinal thickness 108 and longitudinal pitch 110 are selected such that the resulting Bragg grating structure is preferentially coupled to the predetermined wavelength band. The longitudinal pitch of a long period Bragg grating structure determines the peak wavelength reflected by the structure, and the longitudinal pitch of the index-altered portions affects the Q of the grating structure and, thus, the full width half maximum of the reflected wavelength band. Thus, if Bragg grating structure 106 is a long period Bragg grating structure, longitudinal pitch 110 is desirably greater than the longest wavelength of the predetermined wavelength band in the material. Longitudinal thickness 108 is desirably less than half of longitudinal pitch 110. The minimum longitudinal thickness is determined by the minimum feature size that may be formed by the ultrafast laser machining system used to form the FBG, typically greater than 10 nm.

In telecommunication wavelength bands, the index-altered portions 104 of an exemplary Bragg grating structure may desirably have a longitudinal thickness in the range of 0.1 μm to 20 μm, preferably in the range of 5 μm to 10 μm. Their longitudinal pitch may desirably be in the range of 0.5 μm to 500 μm, preferably in the range of 15 μm to 20 μm.

It is noted that the number of periods of the Bragg grating structure, the filling factor, and the fractional index change between inner optical fiber core 100 and index-altered portions 104 determine the fraction of light propagating in inner optical fiber core 100 reflected (or transmitted) in the predetermined wavelength band. The filling factor is a measure of the cross-sectional area of inner optical fiber core 100 filled by index-altered portions 104. For example, the exemplary FBG of FIGS. 1A and 1B has a higher filling factor than the exemplary FBG of FIGS. 1C and 1D. Therefore, if the number of periods and the fractional index change of these two exemplary FBG's are the same, the fraction of light propagating in inner optical fiber core 100 reflected (or transmitted) in the predetermined wavelength band by the exemplary FBG of FIGS. 1A and 1B is greater (less) than that of the exemplary FBG of FIGS. 1C and 1D. It is noted that exemplary Bragg grating structures formed in inner optical fiber core 100 (or outer optical fiber core 102) may also be designed to scatter portions of the light propagating in inner optical fiber core 100 (outer optical fiber core 102) into outer optical fiber core 102 (inner optical fiber core 100). The exemplary FBG's illustrated in FIGS. 6A and 6B may be particularly suited to this purpose.

The desired fraction of light reflected back along inner optical fiber core 100 by Bragg grating structure 106 may be up to 99.9%. Depending on the relative amounts of light coupled into the cores of an exemplary multicore optical fiber, even a high reflectivity grating Bragg grating structure may only reflect a small portion of the total light propagating in the multicore optical fiber. For a number of applications, such as laser wavelength locking, the fraction of the total light reflected may be preferably in the range of 3% to 20%. Only reflecting light propagating in a limited number of modes in inner optical fiber core 100 may improve the quality of an exemplary laser wavelength locking system. Although the exemplary multimode FBG of FIG. 1A has only seven index-altered portions 104, forming six periods of the Bragg grating structure, it is noted that Bragg grating structures of 100 or more periods may be more typical. The number of periods in an FBG is only limited by the length of the optical fiber. For some applications, Bragg grating structures with thousands, or even tens of thousands, of periods may be desirable.

Figure 1C:
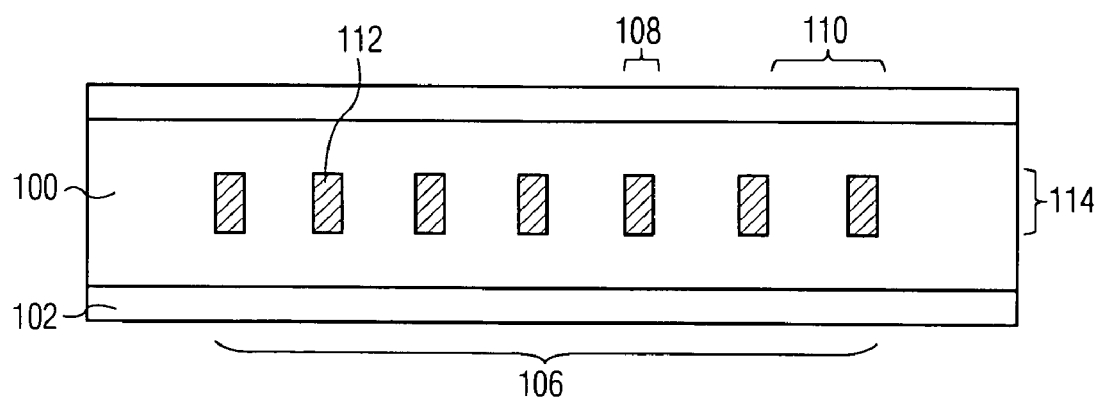
FIG. 1C is a cut-away side plan drawing illustrating an alternative exemplary multicore FBG according to the present invention cut along line 1C of FIG. 1D.
Figure 1D:
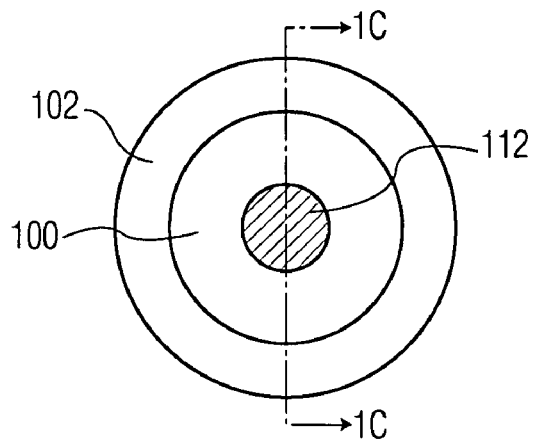
FIG. 1D is an end plan drawing illustrating the alternative exemplary multicore FBG of FIG. 1C.

FIGS. 1C and 1D illustrate another exemplary coaxial multicore FBG 106 formed by a number of cylindrical index-altered portions 112 with substantially planar transmission surfaces located in inner optical fiber core 100. The exemplary coaxial multicore fiber of FIGS. 1C and 1D is shown without a cladding. Although the cladding layer is not require in the present invention, its omission from the illustration of the exemplary embodiment of FIGS. 1C and 1D (as well as several other exemplary embodiments) is for simplification of the drawing and is not intended to be limiting. The difference between the exemplary coaxial multicore FBG of FIGS. 1C and 1D and that of FIGS. 1A and 1B is index-altered portion radius 114 of cylindrical index-altered portions 112 which is less than core radius of inner optical fiber core 100. In the exemplary embodiment of FIGS. 1C and 1D, index-altered portion radius 114 provides a parameter that may be varied to preferentially couple the exemplary Bragg grating structure to a desired subset of transverse modes of a multimode inner optical fiber core.

Figure 4A:
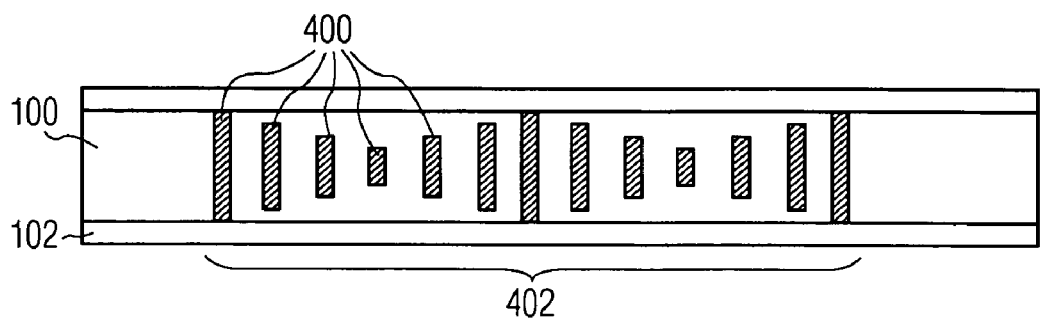
FIGS. 4A, 4B, and 4C are cut-away side plan drawings illustrating yet further exemplary multicore FBG's according to the present invention.

As shown in FIG. 4A, the index-altered portion radius of cylindrical index-altered portions 400 may be varied between different index-altered portions in the longitudinal direction of inner optical fiber core 100 to preferentially couple exemplary Bragg grating structure 402 to a more specific subset of transverse modes of inner optical fiber core 100.

Figure 2A:
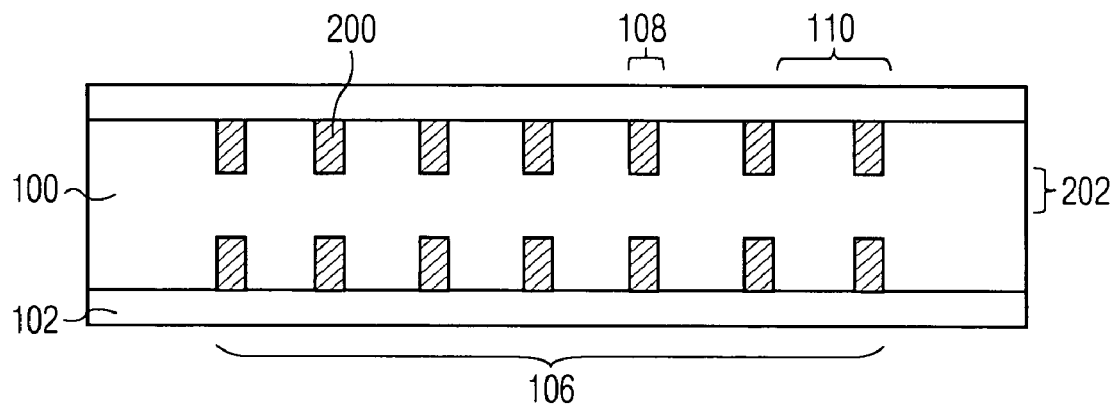
FIG. 2A is a cut-away side plan drawing illustrating another exemplary multicore FBG according to the present invention cut along line 2A of FIG. 2B.
Figure 2B:
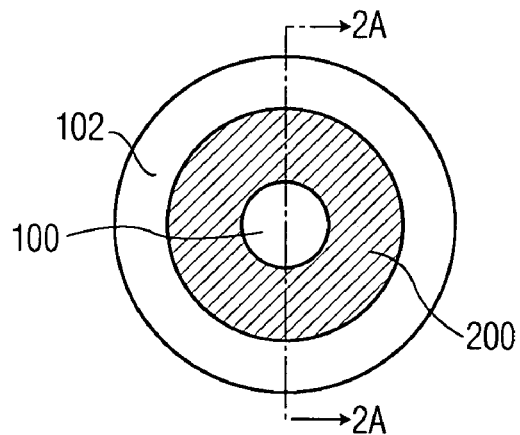
FIG. 2B is an end plan drawing illustrating the exemplary multicore FBG of FIG. 2A.

FIGS. 2A and 2B illustrate alternative exemplary coaxial multicore FBG 106 designed for a predetermined wavelength band. This exemplary coaxial multicore FBG is formed by a number of annular index-altered portions 200 with substantially planar transmission surfaces located in inner optical fiber core 100. Each of these annular index-altered portions includes: a longitudinal index-altered portion axis coaxial to the longitudinal core axis of inner optical fiber core 100; an index-altered portion outer radius, which, in the exemplary embodiment of FIGS. 2A and 2B, is equal to the core radius; and index-altered portion inner radius 202. Index-altered portion inner radius 202 may be selected to preferentially couple Bragg grating structure 106 to a desired subset of transverse modes of inner optical fiber core 100.

Figure 2C:
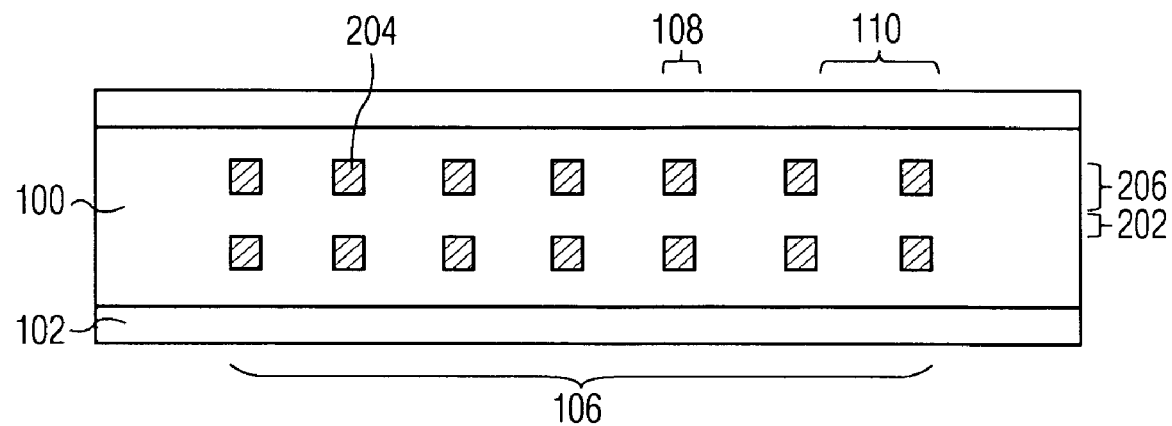
FIG. 2C is a cut-away side plan drawing illustrating a further exemplary multicore FBG according to the present invention cut along line 2C of FIG. 2D.
Figure 2D:
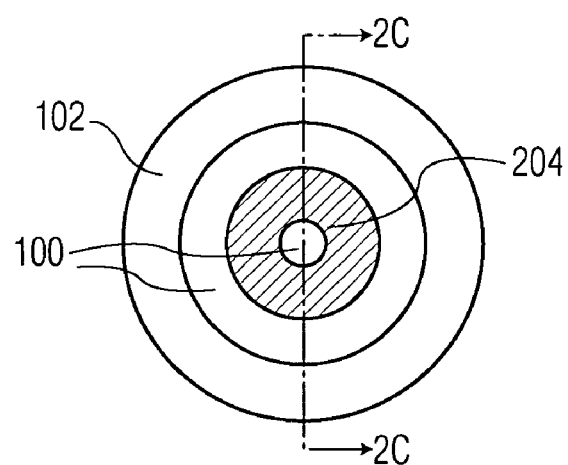
FIG. 2D is an end plan drawing illustrating the exemplary multicore FBG of FIG. 2C.
Figure 4B:
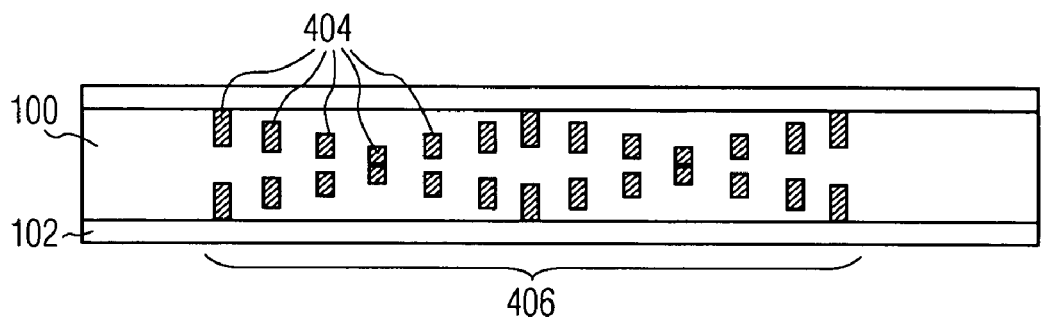

FIGS. 2C and 2D illustrate another exemplary coaxial multicore FBG 106 formed by a number of annular index-altered portions 204 located in inner optical fiber core 100. The exemplary coaxial multicore FBG of FIGS. 2C and 2D differs from the exemplary coaxial multicore FBG of FIGS. 2A and 2B in that index-altered portion outer radius 206 of annular index-altered portions 204, as well as index-altered portion inner radius 202, may be varied to preferentially couple Bragg grating structure 106 to a desired subset of transverse modes of inner optical fiber core 100. Also, as shown in FIG. 4B, one or both of the index-altered portion outer radius and the index-altered portion inner radius 202 of annular index-altered portions 404 may be varied between different index-altered portions in the longitudinal direction of inner optical fiber core 100 to preferentially couple exemplary Bragg grating structure 406 to a more specific subset of transverse modes of inner optical fiber core 100.

Figure 3A:
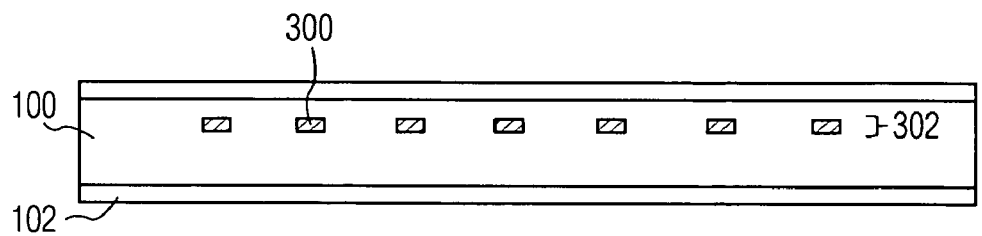
FIG. 3A is a cut-away side plan drawing illustrating an additional exemplary multicore FBG according to the present invention cut along line 3A of FIG. 3B.
Figure 3B:
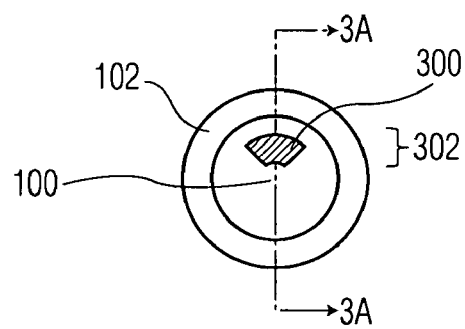
FIG. 3B is an end plan drawing illustrating the exemplary multicore FBG of FIG. 3A.

FIGS. 3A and 3B illustrate further exemplary coaxial multicore FBG 302 designed for a predetermined wavelength band. This exemplary coaxial multicore FBG is formed by a number of index-altered portions 300 located in inner optical fiber core 100. Each of these index-altered portions is in the shape of an annular arcuate segment that includes: an index-altered portion outer radius, which is less than the core radius of inner optical fiber core 100 in the exemplary embodiment of FIGS. 3A and 3B; an index-altered portion inner radius; and an angular extent around the longitudinal core axis of inner optical fiber core 100.

Although not necessary, it may be desirable for the angular extent of annular arcuate segments to be equal to approximately 360°/n, where n is an integer greater than 1. Such annular arcuate segments may be desirable to preferentially couple to subsets of transverse modes of inner optical fiber core 100 described by Laguerre polynomials.

In the exemplary embodiment of FIGS. 3A and 3B, annular arcuate segments 300 are longitudinally arranged in a single line parallel to the longitudinal core axis of inner optical fiber core 100.

Figure 3C:
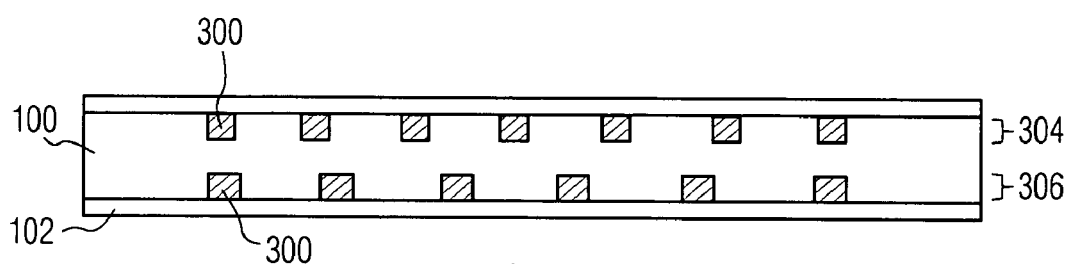
FIG. 3C is a cut-away side plan drawing illustrating an exemplary multi-wavelength multicore FBG according to the present invention cut along line 3C of FIG. 3D.
Figure 3D:
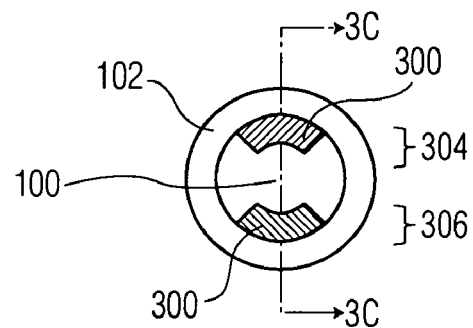
FIG. 3D is an end plan drawing illustrating the exemplary multi-wavelength multicore FBG of FIG. 3C.
Figure 3E:
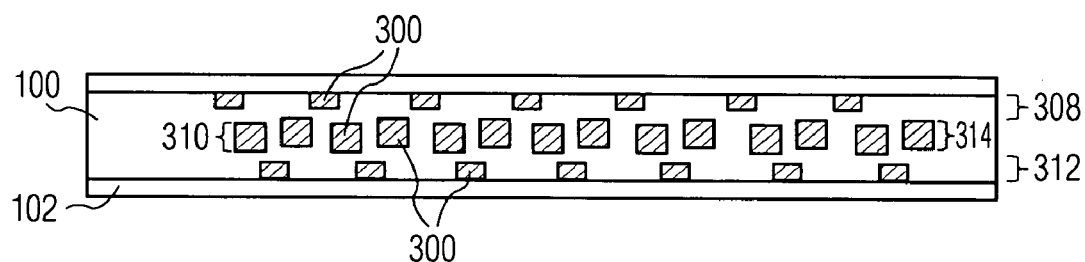
FIG. 3E is a side plan drawing illustrating yet another exemplary multicore FBG according to the present invention.
Figure 3F:
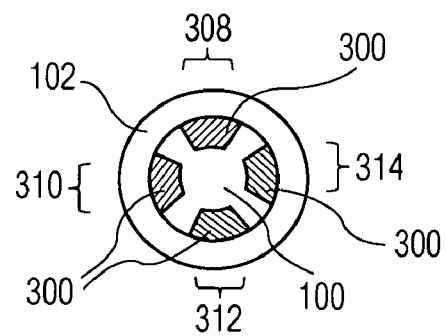
FIG. 3F is an end plan drawing illustrating the exemplary multicore FBG of FIG. 3E.

It is noted that annular arcuate segments 300 may alternatively be aligned in a helix about the longitudinal core axis, as shown in FIGS. 3E and 3F. In this alternative exemplary embodiment, the annular arcuate segments are desirably longitudinally arranged in the helix with neighboring annular arcuate segments having an angular separation of approximately 360°/n, where n is an integer greater than 1 representing the number of annular arcuate segments in one period of the helix. FIGS. 3E and 3F have four annular arcuate segments per period of the helix and, thus, annular arcuate segments 300 of this exemplary coaxial multicore FBG may be aligned into four subsets of annular arcuate segments 308, 310, 312, and 314.

FIGS. 3C and 3D illustrate an exemplary multi-wavelength coaxial multicore FBG formed by two subsets of annular arcuate segments 300 located in inner optical fiber core 100. The annular arcuate segments of subset 304 have a first longitudinal thickness and a first longitudinal pitch within inner optical fiber core 100. The first longitudinal thickness and pitch of these annular arcuate segments are selected such that the portion of the Bragg grating structure formed by subset 304 is preferentially coupled to a first subband of wavelengths of the predetermined wavelength band. The annular arcuate segments of subset 306 have a second longitudinal thickness and a second longitudinal pitch within inner optical fiber core 100, which are selected such that the portion of the Bragg grating structure formed by subset 306 is preferentially coupled to a second subband of wavelengths of the predetermined wavelength band. This second subband of the predetermined wavelength band is desirably different than the first subband, allowing the exemplary coaxial multicore FBG of FIGS. 3C and 3D to couple two subbands of the predetermined wavelength band. The selection of two subsets of annular arcuate segments in FIGS. 3C and 3D is merely illustrative and is not meant to be limiting.

Figure 4C:
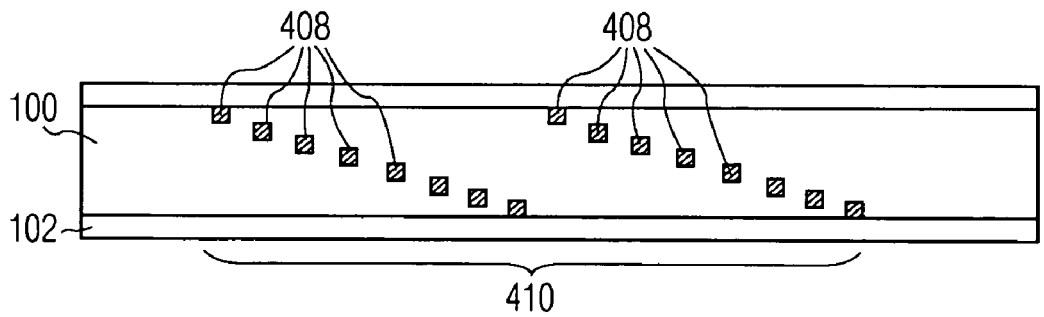

It is noted that any or all of the index-altered portion outer radius, the index-altered portion inner radius, or the angular extent of the annular arcuate segments may be selected to preferentially couple Bragg grating structure 302 to a desired subset of transverse modes of inner optical fiber core 100. Also, as shown in FIG. 4C, the index-altered portion outer radius, index-altered portion inner radius, and/or angular extent of annular arcuate segments 408 may be varied between different index-altered portions in the longitudinal direction of inner optical fiber core 100 to preferentially couple exemplary Bragg grating structure 410 to a more specific subset of transverse modes of inner optical fiber core 100.

Figure 5A:
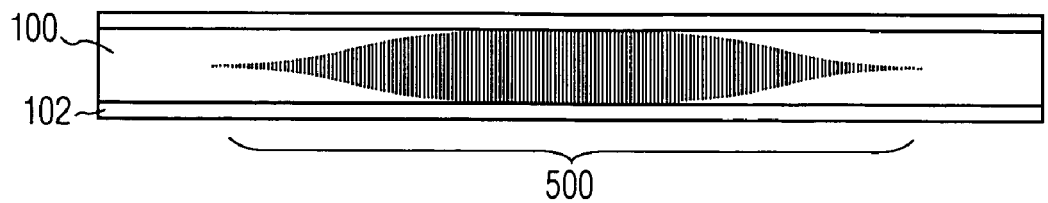
FIGS. 5A and 5B are cut-away side plan drawings illustrating exemplary apodized multicore FBG's according to the present invention.
Figure 5B:
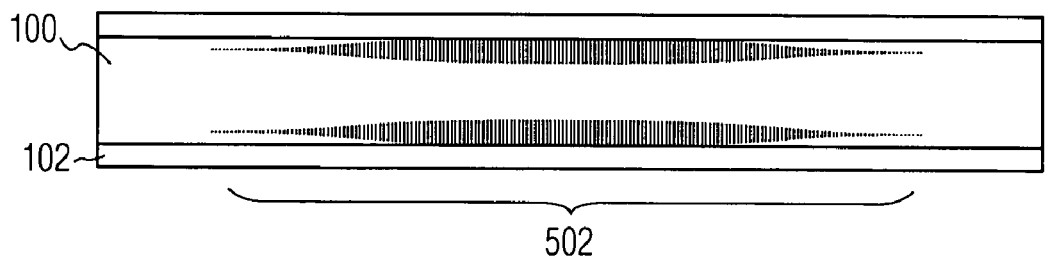

FIGS. 5A and 5B illustrate exemplary apodized coaxial multicore FBG's. FIG. 5A illustrates exemplary apodized coaxial multicore FBG which includes a plurality of index-altered portions having cylindrical shape. The index-altered portion radii of these cylindrical index-altered portions are varied between different index-altered portions in the longitudinal direction of inner optical fiber core 100 such that Bragg grating structure 500 is an apodized Bragg grating structure. FIG. 5B illustrates similar apodized coaxial multicore FBG structure 502 formed of either annular or annular arcuate index-altered portions. In this exemplary structure at least one of the index-altered portion outer radii or the index-altered portion inner radii (or the angular extent for angular arcuate segments) of the plurality of index-altered portions are varied between different index-altered portions in the longitudinal direction of inner optical fiber core 100, desirably forming exemplary apodized Bragg grating structure 502.

Figure 6A:
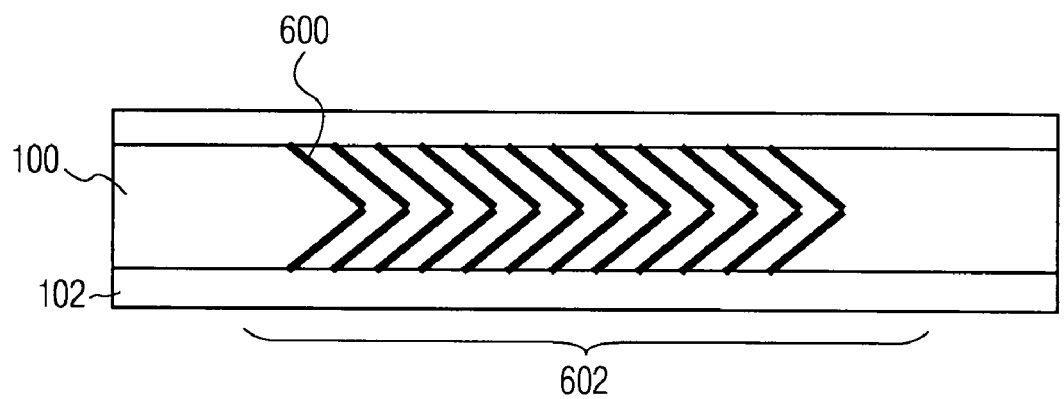
FIGS. 6A and 6B are cut-away side plan drawings illustrating other exemplary multicore FBG's according to the present invention.
Figure 6B:
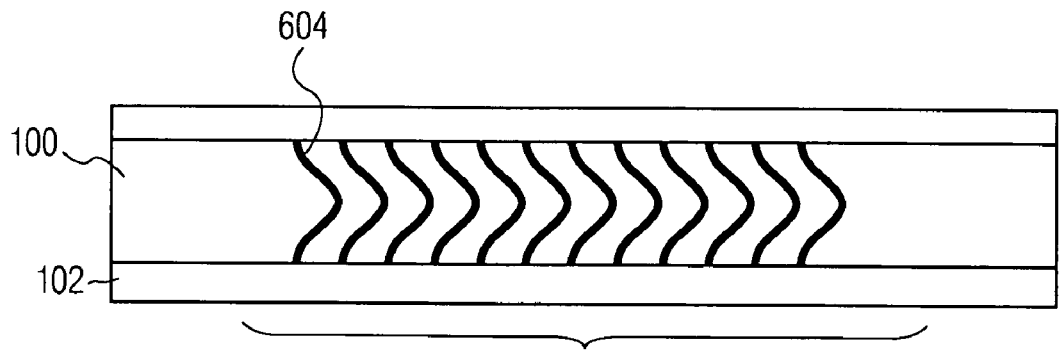

FIGS. 6A and 6B illustrate two additional exemplary coaxial multicore FBG's. In FIG. 6A, exemplary Bragg grating structure 602 is formed by index-altered portions 600 which have transmission surfaces that are conic surfaces, and in FIG. 6B, exemplary Bragg grating structure 606 is formed by index-altered portions 604 which have curved transmission surfaces. The curved transmission surfaces of index-altered portions 604 may be aspherical curved, as shown in FIG. 6B, or they may be spherical curved surfaces. Exemplary Bragg grating structures, such as those of FIGS. 6A and 6B, in which the index-altered portions have non-planar transmission surfaces may be desirable for converting transverse modes of light propagating in a multimode inner fiber core. Such control of the relative power in various transverse modes of the propagating field may desirably improve coupling efficiencies in spliced fiber couplers or other fiber coupling means. Alternatively, such exemplary Bragg grating structures with index-altered portions having non-planar transmission surfaces may be desirable to scatter portions of the light propagating in inner optical fiber core 100 into outer optical fiber core 102. Although the exemplary index-altered portions with non-planar transmission surfaces are shown in FIGS. 6A and 6B extending across the width of inner optical fiber core 100, it is contemplated that non-planar transmission surface index-altered portions may also be formed with index-altered portion radii less than the fiber core radius and/or may be formed as annuli or annular arcuate segments.

Figure 7:
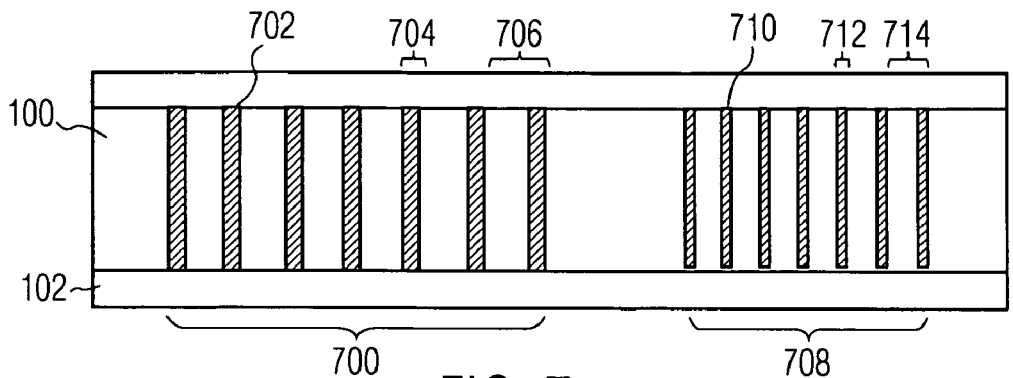
FIG. 7 is a cut-away side plan drawing illustrating an exemplary multi-wavelength multicore FBG according to the present invention.

FIGS. 7, 8, 9, and 10 illustrate several exemplary multi-wavelength coaxial multicore FBG's. FIG. 7 illustrates an exemplary multi-wavelength coaxial multicore FBG in which the index-altered portions are separated longitudinally into two subsets, index-altered portions 702, which form first portion 700 of the Bragg grating structure, and index-altered portions 710, which form second portion 708. Index-altered portions 702 in first portion 700 have a first longitudinal thickness 704 and a first longitudinal pitch 706 within inner optical fiber core 100 which are selected such that first portion 700 of the Bragg grating structure is preferentially coupled to a first subband of wavelengths of the predetermined wavelength band. Index-altered portions 710 in second portion 708 have a second longitudinal thickness 712 and a second longitudinal pitch 714 within inner optical fiber core 100 which are selected such that second portion 708 of the Bragg grating structure is preferentially coupled to a second subband of wavelengths of the predetermined wavelength band, which is different than the first subband of wavelengths. Thus, the resulting Bragg grating structure may desirably act as two separate coaxial multicore FBG's.

It is noted that although FIG. 7 includes only two portions the Bragg grating structure coupled to different subband of wavelengths of the predetermined wavelength band, this choice is merely for simplified illustration and is not limiting. Also, although exemplary subsets of index-altered portions 702 and 710 are shown in FIG. 7 as cylindrical portions extending across the width of inner optical fiber core 100, it is contemplated that cylindrical index-altered portions with index-altered portion radii less than the fiber core radius and/or annular or annular arcuate index-altered portions may be used to form exemplary multi-wavelength coaxial multicore FBG's. The use of these alternative index-altered portions may allow for the various portions of the resulting Bragg grating structure to be preferentially coupled to different subsets of transverse modes of the inner optical fiber core (if it is a multimode core) as well as different subbands of wavelengths. Further the use of annular arcuate index-altered portions in multi-wavelength coaxial multicore FBG's may allow for a reduction of the longitudinal length of the Bragg grating structure, as shown in FIG. 3C.

Figure 8:
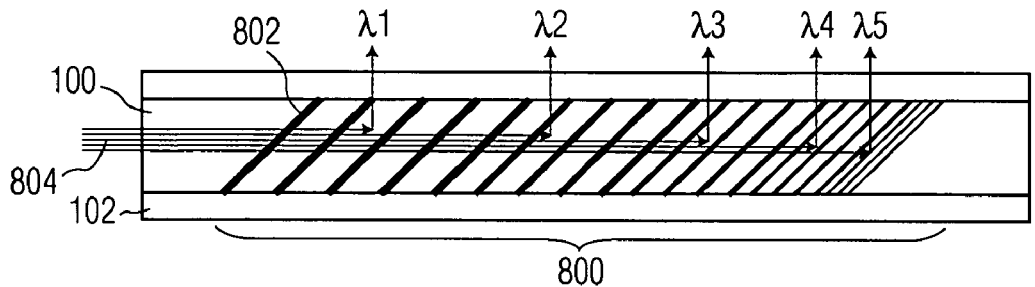
FIG. 8 is a cut-away side plan drawing illustrating an exemplary multi-wavelength multicore FBG optical tap according to the present invention.

FIG. 8 illustrates another exemplary multi-wavelength coaxial multicore FBG 800 which may function as a wavelength dispersive optical tap. In this exemplary embodiment, oblique cylindrical index-altered portions 802 have tilted planar transmission surfaces. These are planar transmission surfaces are tilted within inner optical fiber core 100 such that the longitudinal core axis of the coaxial multicore optical fiber has a predetermined angle of incidence with the surfaces. These tilted planar transmission surfaces allow multi-wavelength coaxial multicore FBG 800 to reflect a predetermined fraction of propagating light 804 through outer optical fiber core 102 (and the cladding layer as well if a cladding layer is included) so that the intensity of propagating light 804 may be monitored. It is noted that other Bragg grating structures, particularly those with asymmetric index-altered portions and/or index-altered outer optical fiber core portions (such as those shown in FIGS. 9 and 10), may predictably scatter light through outer optical fiber core 102 and, thus, may also be used to form optical taps in multicore optical fibers.

Additionally, in the exemplary embodiment of FIG. 8, the longitudinal thickness and the longitudinal pitch of oblique cylindrical of index-altered portions 802 is continuously varied along the longitudinal direction of inner optical fiber core 100 to form a chirped Bragg grating structure. This allows the various wavelengths of propagating light 804 ($\lambda_1$, $\lambda_2$, $\lambda_3$, $\lambda_4$, and $\lambda_5$) to be reflected through outer optical fiber core 102 at different points by multi-wavelength coaxial multicore FBG 800. In this way the spectral composition of propagating light 804 may be monitored.

FIG. 9 illustrates an additional exemplary coaxial multicore FBG with the two portions of the Bragg grating structure formed by different types of index-altered portions. Cylindrical index-altered portions 900 extend from inner optical fiber core 100 into outer optical fiber core 102, while annular index-altered cladding portions 902 are formed entirely within outer optical fiber core 102. Index-altered portions 900 and index-altered cladding portions 902 may extend part way through outer optical fiber core 102, as shown in FIG. 9, or all of the way to the outer core surface. It is noted that either cylindrical index-altered portions 900 or annular index-altered cladding portions 902 may extend into cladding layer 103 as well. In addition to coupling the Bragg grating structure to light propagating in the outer optical fiber core, the extension of index-altered portions into the outer optical core may increase the coupling of some higher order transverse modes of the inner optical fiber core to the Bragg grating structure, while the formation of index-altered cladding portions entirely within outer optical fiber core 102 may reduce perturbations to lower order transverse modes of the inner optical fiber core caused by the Bragg grating structure. In multicore optical fibers with single mode inner cores, the formation of index-altered portions within the outer optical fiber core may allow coupling of evanescent portions of the propagating light either to reflect a fraction of the light in the predetermined wavelength band back along the inner optical fiber core or to scatter light into the inner optical fiber core. Index-altered portions in the outer optical fiber core may also serve to scatter light in the predetermined wavelength band in one or both of the optical fiber cores to create mixing between the light propagating in the different cores or to form an optical tap. As with index-altered portions formed entirely within the inner optical fiber core, various parameters of index-altered portions formed partially or entirely within the outer optical fiber core of a multicore optical fiber may be varied between different index-altered portions in the longitudinal direction of the optical fiber such that the resulting Bragg grating structure is an apodized Bragg grating structure.

It is contemplated that both annular and annular arcuate index-altered portions may be extended into outer optical fiber layer, as well. Also, index-altered portions formed entirely in inner optical fiber core 100 may be combined with index-altered portions extended into outer optical fiber core 102 and/or index-altered cladding portions are formed entirely within outer optical fiber core 102.

Figure 10:
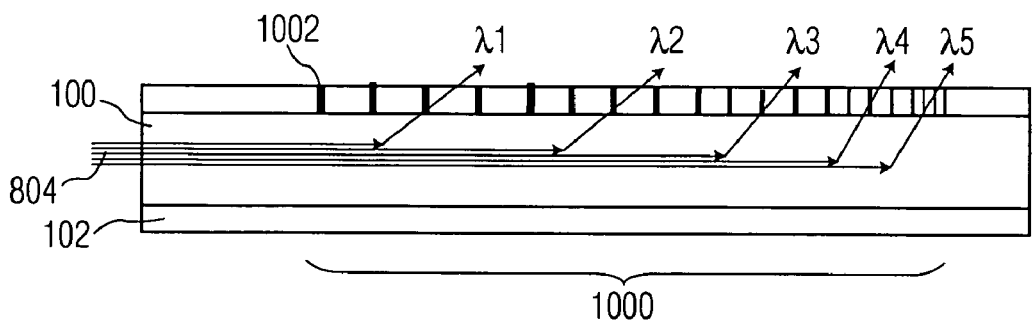
FIG. 10 is a cut-away side plan drawing illustrating an additional exemplary multi-wavelength multicore FBG optical tap according to the present invention

FIG. 10 illustrates another exemplary chirped coaxial multicore FBG 1000, formed by index-altered annular arcuate segments 1002 formed entirely within outer optical fiber core 102. As illustrated by the exemplary scattering of propagating light 804 through outer optical fiber core 102, exemplary chirped coaxial multicore FBG 1000 may be used as a wavelength dispersive optical tap to monitor the spectral composition of propagating light 804.

It is contemplated that an exemplary coaxial multicore FBG may also be formed in which the index-altered portions are arranged in a non-periodic pattern. The resulting Bragg grating structure may desirably be formed to have a predetermined transmission spectrum in the predetermined wavelength band for light propagating in each optical fiber core, thus allowing the spectrum of light transmitted through the fiber to be altered to a desired spectral shape and distribution.

Another exemplary embodiment of the present invention is a multicore optical fiber with an integral photonic crystal section. These integral photonic crystal structures may be formed using an ultrafast laser machining system alter portions of one or more of the optical fiber cores of these fibers in a manner similar to the methods used to form the Bragg grating structures described above. The inclusion of photonic crystal sections within the core of single mode and multimode optical fiber cores may allow even greater control of the light propagated along these cores and the coupling between the cores. Additionally, these integral photonic crystal structures may be useful for improving coupling efficiencies between multicore optical fibers and other optical components, including other optical fibers. Further, highly selective wavelength specific couplers may be created using these integral photonic crystal structures. Such couplers may be particularly desirable for use in dense wavelength division multiplexing optical communication systems.

Figure 12A:
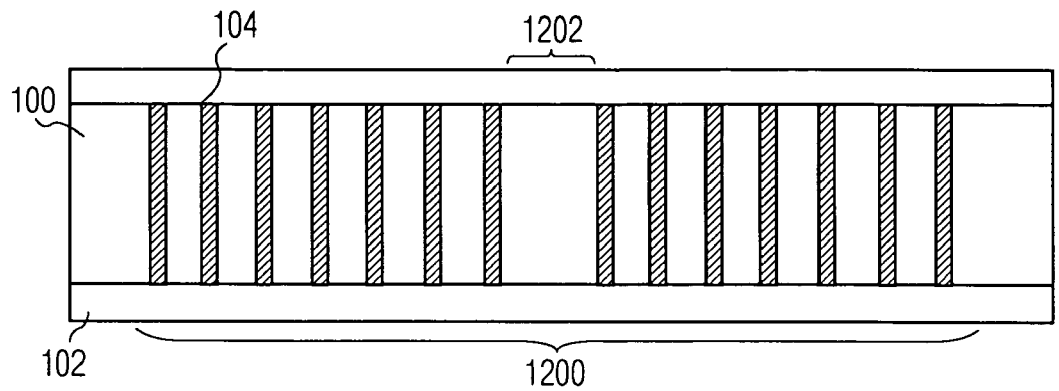
FIG. 12A is a cut-away side plan drawing illustrating an exemplary multicore fiber with an integral one-dimensional photonic crystal according to the present invention.
Figure 12B:
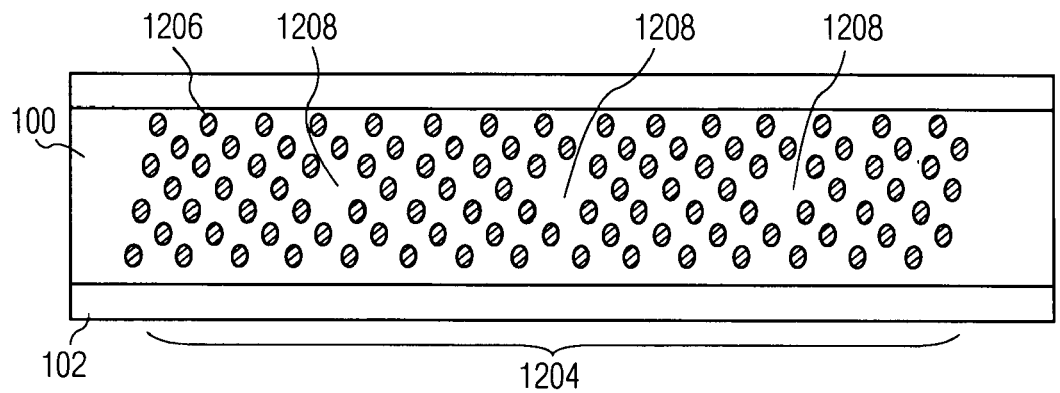
FIG. 12B is a cut-away side plan drawing illustrating an exemplary multicore fiber with an integral three-dimensional photonic crystal according to the present invention.

FIGS. 12A and 12B illustrate such exemplary structures formed in the inner optical fiber cores of coaxial multicore optical fibers. Coaxial multicore optical fibers have been selected for the examples for illustrative purposes. In FIG. 12A, inner optical fiber core 100 includes cylindrical index-altered portions 104, which have an altered index of refraction different from the initial index of refraction of the non-photosensitive material of inner optical fiber core 100. Cylindrical index-altered portions 104 are arranged within inner optical fiber core 100 to form one dimensional photonic crystal structure 1200. One dimensional photonic crystal structure 1200 appears similar to Bragg grating structure 106 of FIG. 1A, except for the inclusion of defect 1202. (It is also noted that the longitudinal thickness and longitudinal pitch of cylindrical index-altered portions 104 in one dimensional photonic crystal structure 1200 may be desirably less than those in Bragg grating structure 106.)

FIG. 12B illustrates an exemplary coaxial multicore optical fiber with three dimensional photonic crystal structure 1204 formed within inner optical fiber core 100. Exemplary three dimensional photonic crystal structure 1204 is formed of large number of regularly spaced spherical index-altered portions 1206. The lattice formed by spherical index-altered portions 1206 is interrupted by defects 1208, which occur at regular intervals.

It is noted that, although both defect 1202 in one dimensional photonic crystal structure 1200 and defects 1208 in three dimensional photonic crystal structure 1204 result from a missing index-altered portion, other types of defects may be formed in these exemplary photonic crystal structures, such as an additional index-altered portion, an index-altered portion having a different shape, or change in the period structure of the photonic crystal. It is also noted that exemplary two dimensional photonic crystal structures may be formed in multimode optical fiber cores according to this exemplary embodiment of the present invention. One skilled in the art may understand that photonic crystal structures similar to those illustrated in FIGS. 12A and 12B may be formed in an outer optical fiber core as well.

A further exemplary embodiment of the present invention is an optical fiber with integral diffractive coupling optics. These integral diffractive coupling optics structures may also be formed using an ultrafast laser machining system to alter portions of one of more of the optical fiber cores near the input and output surfaces of a multicore optical fiber. The inclusion of integral diffractive coupling optics within the cores of multicore optical fibers may greatly improve coupling efficiencies between these optical fibers and other optical components. They may also allow for space saving solutions in fiber optics systems by reducing, or eliminating, the need for free space coupling optics within these systems. Such integral diffractive coupling optics may also prove useful in multiplexed optical communication systems allowing light propagating along the different optical fiber cores of a multicore optical fiber to be efficiently separated. As in the exemplary embodiments of FIGS. 12A and 12B, coaxial multicore optical fibers have been selected in FIGS. 13A-F for illustrative purposes. Also, it is noted that the exemplary embodiments of FIGS. 13A-F include integral diffractive coupling optics only in their inner optical cores. This is merely for simplicity of illustration and is not intended to be limiting.

Figure 13A:
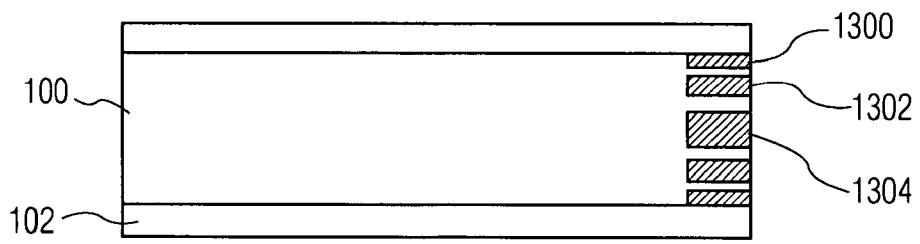
FIG. 13A is a cut-away side plan drawing illustrating an exemplary multicore fiber with integral diffractive coupling optics according to the present invention cut along line 13A of FIG. 13B.
Figure 13B:
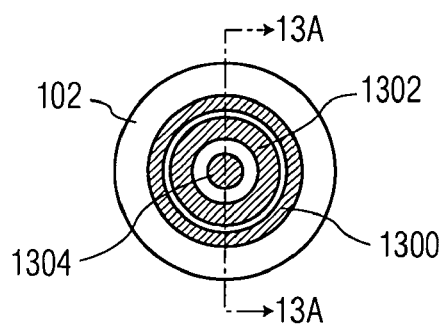
FIG. 13B is an end plan drawing illustrating the exemplary multicore fiber with integral diffractive coupling optics of FIG. 13A.

FIGS. 13A and 13B illustrate one exemplary coaxial multicore optical fiber with integral diffractive coupling optics. In this example, inner optical fiber core 100 includes a coupling section adjacent to the substantially planar end surface. This coupling section is formed by concentric annular index-altered portions 1300 and 1302 and cylindrical index-altered portion 1304 which have an altered index of refraction different from the initial index of refraction of the non-photosensitive material of inner optical fiber core 100. Concentric annular index-altered portions 1300 and 1302 and cylindrical index-altered portion 1304 are arranged to form a circular two dimensional diffractive optical lens. This lens may be spherical or aspherical depending on the radii of the index-altered portions. It is noted that the focal length of this exemplary circular two dimensional diffractive optical lens is wavelength dependent. Thus, such lenses may not be desirable for broad bandwidth applications.

Figure 13C:
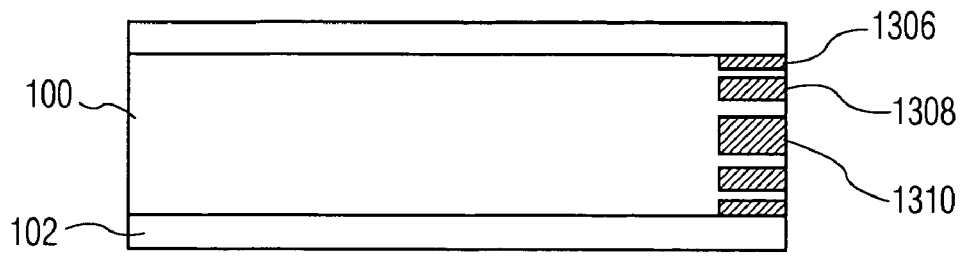
FIG. 13C is a cut-away side plan drawing illustrating an alternative exemplary multicore fiber with integral diffractive coupling optics according to the present invention cut along line 13C of FIG. 13D.
Figure 13D:
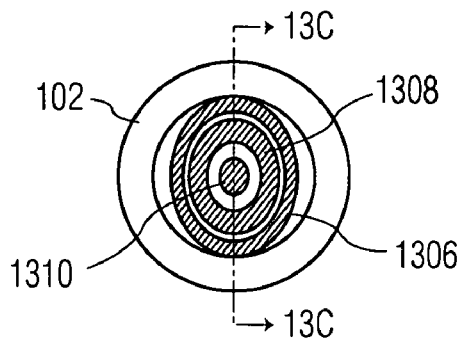
FIG. 13D is an end plan drawing illustrating the exemplary multicore fiber with integral diffractive coupling optics of FIG. 13C.

FIGS. 13C and 13D illustrate another exemplary coaxial multicore optical fiber with an integral elliptical two dimensional diffractive optical lens. In this example, the coupling section is formed by concentric elliptical annular index-altered portions 1306 and 1308 and elliptical index-altered portion 1310 which have an altered index of refraction different from the initial index of refraction of the non-photosensitive material of inner optical fiber core 100. This lens may be designed to have a small ellipticity of a large ellipticity depending on the desired ratio of the cone angles in the X and Y directions.

Figure 13E:
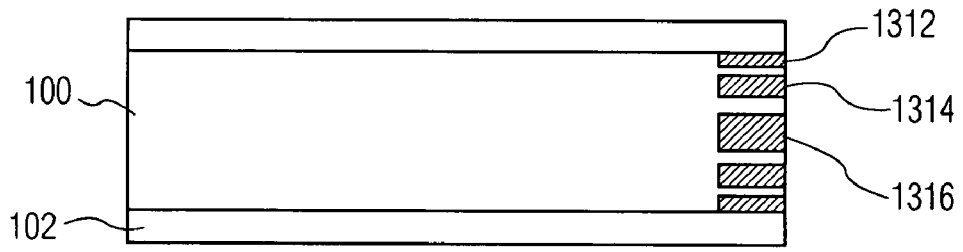
FIG. 13E is a cut-away side plan drawing illustrating another exemplary multicore fiber with integral diffractive coupling optics according to the present invention cut along line 13E of FIG. 13F.
Figure 13F:
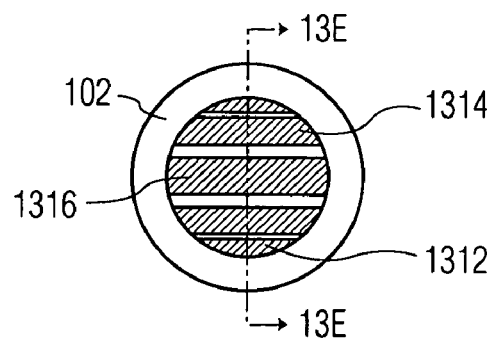
FIG. 13F is an end plan drawing illustrating the exemplary multicore fiber with integral diffractive coupling optics of FIG. 13E.

FIGS. 13E and 13F illustrate a further exemplary coaxial multicore optical fiber with an integral one dimensional diffractive optical lens. This exemplary integral coupling optics section may function as a cylindrical lens. Such lens may be particularly desirable for coupling light from semiconductor lasers into the inner optical fiber core of a coaxial multicore optical fiber. The coupling section of FIGS. 13E and 13F is formed in inner optical fiber core 100 by parallel linear index-altered portions 1312, 1314, and 1316. Parallel linear index-altered portions 1312, 1314, and 1316 are sized and arranged such that the integral diffractive coupling optics formed in the coupling section of inner optical fiber core 100 is a one dimensional diffractive optical lens. It is noted that parallel linear index-altered portions 1312, 1314, and 1316 may also form a transmission grating, if equally sized and spaced, allowing various wavelengths of light propagating in the coaxial multicore optical fiber to by diffracted in separate directions.

Another exemplary embodiment of the present invention is a multicore optical fiber that includes two or more parallel, non-coaxial optical fiber cores in a cladding layer and has an integral diffractive structure formed in at least one of the non-coaxial optical fiber cores or the cladding layer. These integral diffractive structures may include any of the diffractive structures described above and may be formed using an ultrafast laser machining system alter portions of one or more of the optical fiber cores or the cladding of these fibers in a manner similar to the methods used to form the diffractive structures in coaxial multicore optical fibers described above.

Figure 11A:
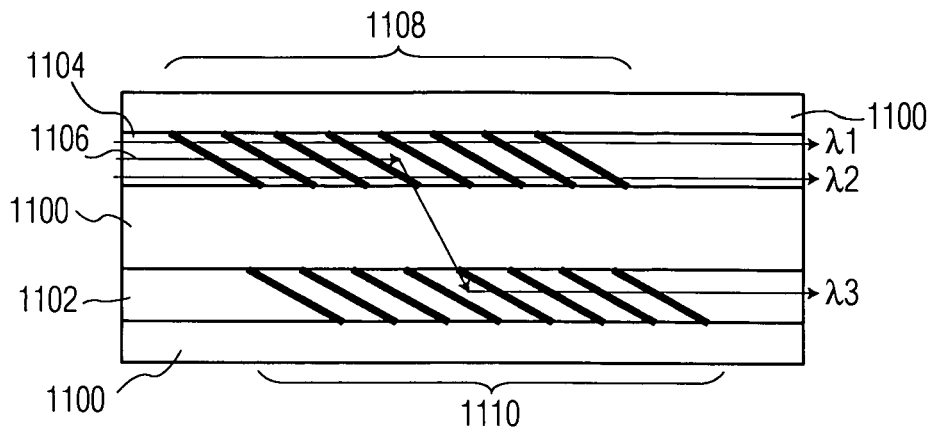
FIG. 11A is a cut-away side plan drawing illustrating still another exemplary multicore FBG according to the present invention cut along line 11A of either of FIGS. 11B and 11D.
Figure 11B:
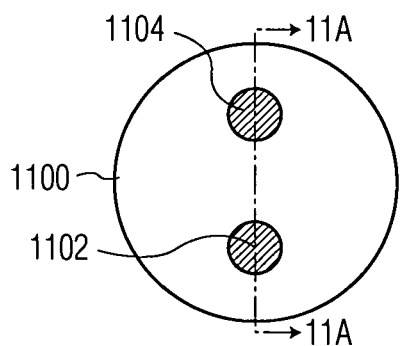
FIG. 11B is an end plan drawing illustrating one embodiment of the exemplary multicore FBG of FIG. 11A.
Figure 11C:
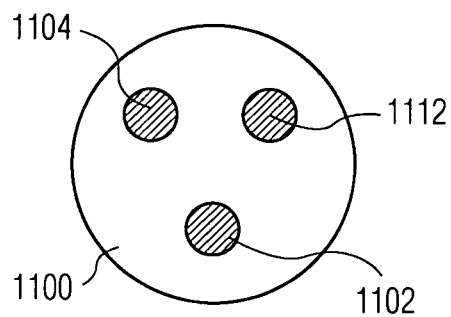
FIG. 11C is an end plan drawing illustrating an exemplary multicore FBG similar to the exemplary multicore FBG FIG. 11A.
Figure 11D:
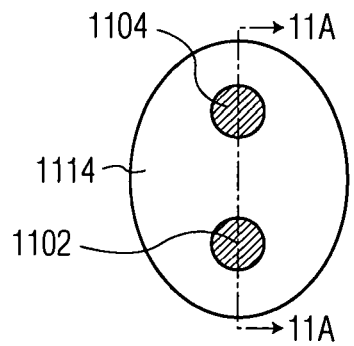
FIG. 11D is an end plan drawing illustrating an alternative embodiment of the exemplary multicore FBG of FIG. 11A.

FIG. 11A illustrates an exemplary multicore FBG with parallel, non-coaxial optical fiber cores 1102 and 1104. FIGS. 11B, 11C, and 11D illustrate three alternative exemplary configurations of parallel, non-coaxial optical fiber cores within the cladding layer of a multicore optical fiber. The three illustrated configurations are merely illustrative and are not meant to be exhaustive. Also, it is noted that, although the exemplary non-coaxial optical fiber cores are illustrated in FIGS. 11A-D as having circular cylindrical shapes and being approximately equally sized, optical fiber cores having other cross-sectional shapes may be used, as well as cores having different sizes. FIG. 11B illustrates two non-coaxial optical fiber cores 1102 and 1104 arranged in cladding layer 1100, which has a circular cross-section. FIG. 11C illustrates three non-coaxial optical fiber cores 1102, 1104, and 1112 arranged symmetrically in circular cladding layer 1100. FIG. 11D illustrates two non-coaxial optical fiber cores 1102 and 1104 arranged in cladding layer 1100, which has an elliptical cross-section. In the exemplary configuration of FIG. 11D the two non-coaxial optical fiber cores 1102 and 1104 may each desirably include a focal axis of the elliptical cylinder of cladding layer 1100 to allow significant coupling (or decoupling) of certain transverse modes between non-coaxial optical fiber cores 1102 and 1104 in this exemplary embodiment.

It is noted that, although the indices of refraction between the various non-coaxial optical fiber cores may desirably be the same in many cases, they may instead differ, depending on the specific application. In either case, the cladding index of refraction of the cladding layer surrounding the non-coaxial optical fiber cores is selected to be less than the initial index of refraction of any of the optical fiber cores to assist in confinement of light propagation in the optical fiber cores.

FIG. 11A illustrates a multicore FBG designed to couple a portion light 1106 having a specific wavelength, $\lambda_3$, from optical fiber core 1104 to optical fiber core 1102, without significantly affecting those portions of light 1106 having other wavelengths, $\lambda_1$ and $\lambda_2$. Tilted FBG section 1108 is used to diffract light of the desired wavelength out of optical fiber core 1104. Tilted FBG section 1110, which is arranged longitudinally in optical fiber core 1102 such that the diffracted light is incident upon it, may be used to efficiently couple the diffracted light into optical fiber core 1102. If optical fiber core 1104 is a multimode optical fiber core, the light portion may be preferentially diffracted from a specific transverse mode or subset of transverse modes of optical fiber core 1104. A system of wavelength specific tilted FBG sections arranged between several non-coaxial optical fiber cores may create an efficient multiplexer/demultiplexer for wavelength division multiplexing optical communication systems.

It is noted that the exemplary design of the paired tilted FBG sections in FIG. 11A allows reversible coupling between optical fiber cores 1102 and 1104, however careful design of tilted FBG section 1108 may allow the diffracted light to be adequately coupled into optical fiber core 1102 without tilted FBG section 1110. Such a single tilted FBG section design would only allow coupling of light from optical fiber core 1104 to optical fiber core 1102.

Figure 15A:
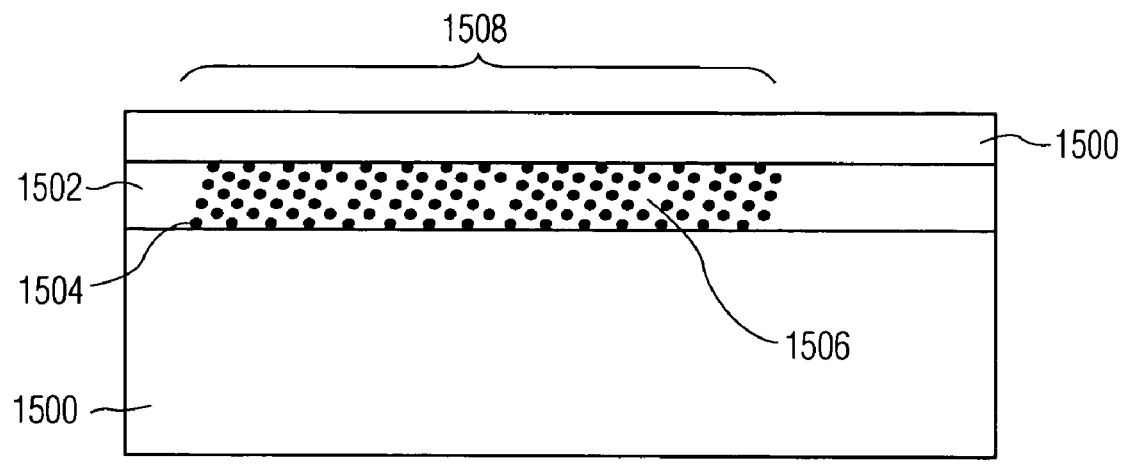
FIG. 15A is a cut-away side plan drawing illustrating an exemplary multicore fiber with an integral three-dimensional photonic crystal according to the present invention cut along line 15A of FIG. 15B.
Figure 15B:
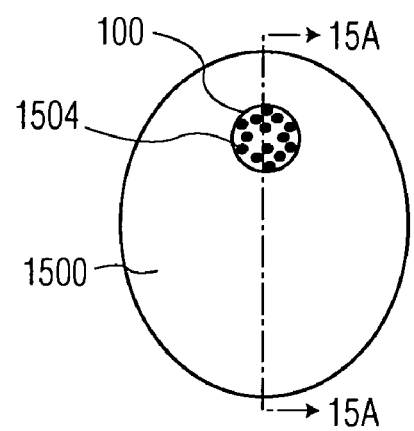
FIG. 15B is an end plan drawing illustrating the exemplary multicore fiber with an integral three-dimensional photonic crystal of FIG. 15A.

FIGS. 15A and 15B illustrate another type of exemplary non-coaxial multicore optical fiber with an integral diffractive structure formed in one of the optical fiber cores, in this case three dimensional photonic crystal structure 1508. Exemplary three dimensional photonic crystal structure 1508 is formed of large number of regularly spaced spherical index-altered portions 1504. The lattice formed by spherical index-altered portions 1504 is interrupted by defects 1506, which occur at regular intervals. This photonic crystal structure is formed within inner optical fiber core 100, which is offset from the center axis of outer optical fiber core 1500. In this exemplary embodiment, outer optical fiber core 1500 has an elliptical cylindrical shape and inner optical fiber core 100 is aligned along one the focal axes of outer optical fiber core 1500, however this specific geometry is merely illustrative and not intended to be limiting, as is the selection of three dimensional photonic crystal structure 1508 as the integral diffractive structure.

The various multicore optical fiber structures described above may be used to design a number of exemplary optical devices, one example of which is a wavelength stabilized, high power, uncooled laser source. Operating a laser in an uncooled mode may be desirable to reduce power consumption used to cool the laser, as well as to reduce the feedback circuitry used to control the laser's temperature. Unfortunately, such uncooled operation may cause difficulties with maintaining a constant output wavelength of the laser. This is due to the thermal dependence of the output wavelength of the laser. These difficulties may be magnified in high power applications where large quantities of heat are generated by the laser and the temperature may vary over a large range.

One method of overcoming these difficulties is the use of an external optical cavity to lock the output wavelength of the laser by coupling light resonant with the external cavity back into the laser. Optically coupling the laser and the external cavity may necessitate additional optics, leading to added complexity and increased power loss. Such external cavities also are desirably thermally isolated or are designed to have low temperature dependence.

Figure 14:
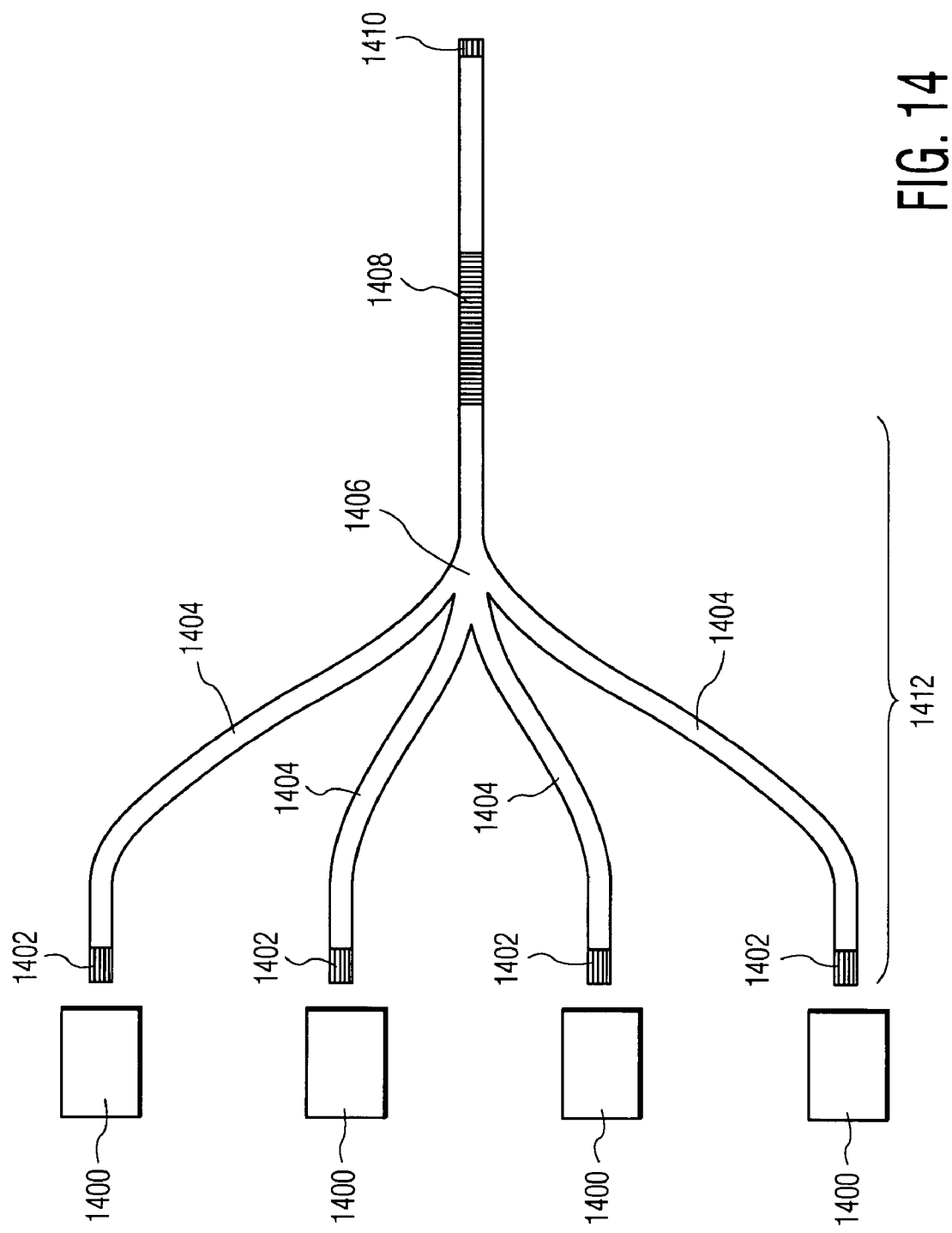
FIG. 14 is a block schematic diagram illustrating an exemplary wavelength stabilized, high power, uncooled laser source according to the present invention.

FIG. 14 illustrates an exemplary wavelength stabilized, high power, uncooled laser source, which uses exemplary multicore FBG 1408 to lock the laser output wavelength. An exemplary type of high power laser for which the exemplary embodiment of FIG. 14 may be particularly desirable is a continuous wave semiconductor laser. This exemplary wavelength stabilized, high power, uncooled laser source includes four high power lasers 1400. These four lasers are optically coupled into four coupling optical fibers 1404, which are optically coupled to a single multicore optical fiber at fiber coupler 1406. Fiber coupler 1406 is desirably a low loss fiber coupler, such as a star coupler or a spliced fiber coupler, as shown in FIG. 14. It may be desirable to use a coaxial multicore optical fiber and to couple all of the lasers to all of the optical fiber cores. It is noted that multicore optical fibers including one or more multimode optical fiber cores may desirable in this application for their high power handling capabilities.

The single multicore optical fiber desirably includes a low loss inner optical fiber core formed of a non-photosensitive material in which a plurality of index-altered portions, having an altered index of refraction, have been formed using an ultrafast laser machining system. The index-altered portions may desirably be arranged within the non-photosensitive material of the inner optical fiber core to form Bragg grating structure 1408, which may be a long period Bragg grating structure. This Bragg grating structure is desirably adapted to reflect a predetermined fraction of light in the desired wavelength band back along the optical fibers and into high power lasers 1400, thereby locking the output wavelength band of the wavelength stabilized, high power, uncooled laser source to the desired wavelength band. Bragg grating structure 1408 may reflect up to 99.9% of the light coupled into the inner optical fiber core, which may desirably represent 3% to 20% of the light provided by the laser in the desired wavelength band back into the laser.

The inner optical fiber core may be a single mode optical fiber core, which may provide narrower bandwidth feedback for wavelength locking of high power lasers 1400, or a multimode optical fiber core, which may provide more feedback for wavelength locking of high power lasers 1400.

It is noted that it may be desirable for high power lasers 1400 and the multicore optical fibers of the exemplary system to be substantially thermally uncoupled, or, alternatively, for the non-photosensitive material of the inner optical fiber core of the single multicore optical fiber to have a coefficient of thermal expansion low enough to prevent an undesirable shift in the desired wavelength band reflected by Bragg grating structure 1408 during operation. Another approach to reduce heating of Bragg grating structure 1408 during operation of high power lasers 1400 is to provide thermal buffering section 1412, an unaltered section of multicore optical fiber between the laser coupling surface and Bragg grating section 1408.

This exemplary external cavity wavelength locker includes only a small number of relatively simple optical components. Also, by utilizing low loss multicore optical fibers with both multimode and single mode cores formed of non-photosensitive materials, power loss in the system may be kept low. Additionally, coupling losses may be reduced further by forming additional exemplary diffractive structures in the optical fiber cores, such as coupling sections 1402, similar to those shown in FIGS. 13A-F, adjacent to the laser coupling surfaces of coupling optical fibers 1404 and output section 1410 adjacent to the output surface of the single multicore optical fiber. Because these diffractive structures are formed within the cores of the optical fibers, they may have lower losses than the free standing optical elements that they may replace.

It is noted that the exemplary wavelength stabilized, high power, uncooled laser source shown in FIG. 14 includes four high power lasers 1400. The choice of four lasers is only exemplary and one skilled in the art may understand that other numbers of high power lasers may be used in an exemplary wavelength stabilized, high power, uncooled laser source according to the present invention. This may include a system with a single high power laser, in which case, coupling optical fibers 1404 and fiber coupler 1406 may be omitted from the laser source without affecting its operation.

Further, Bragg grating structure 1408 may include any of the alternative embodiments described above with reference to FIGS. 1A-11B. In particular, Bragg grating structure 1408 may include multiple subsets of index-altered portions preferentially coupled to different subband of wavelengths of the predetermined wavelength band and/or different transverse modes of the laser light propagating in the various optical fiber cores of the multicore optical fiber in which Bragg grating structure 1408 is formed.

The many exemplary embodiments of the invention are mostly described in terms of forming structures in circular optical fibers. However, it is contemplated that the exemplary structures described herein may be formed in optical waveguides of different cross-sectional shapes, including elliptical, rectangular, polygonal, and polarization-maintaining optical fibers.

Although illustrated and described above with reference to certain specific embodiments, the present invention is nevertheless not intended to be limited to the details shown. Rather, various modifications may be made in the details within the scope and range of equivalents of the claims and without departing from the invention.

What is claimed is:

1. A multicore optical fiber with an integral diffractive element, comprising:
   a first optical fiber core formed of a non-photosensitive material having an initial index of refraction, the first optical fiber core including;
   a first longitudinal core axis;
   a plurality of index-altered portions along the first optical fiber core in a longitudinal direction and having an altered index of refraction different from the initial index of refraction; and
   a second optical fiber core including a second longitudinal core axis substantially parallel to the first longitudinal axis;
   wherein:
   the second optical fiber core has a circular cylindrical shape, a core radius, and another index of refraction which is greater than the initial index of refraction of the first optical fiber core;
   the first longitudinal axis of the first optical fiber core and the second longitudinal axis of the second optical fiber core are collinear; and
   the first optical fiber core has an annular cylindrical shape, an inner core radius equal to the core radius of the second optical fiber core, and an outer core radius; and
   the plurality of index-altered portions are arranged within the non-photosensitive material of the first optical fiber core to form a diffractive structure.

2. A multicore optical fiber according to claim 1, wherein the non-photosensitive material of the first optical fiber core includes at least one of: fused silica; borosilicate; quartz; zirconium fluoride; silver halide; chalcogenide glass; optical plastic; clear fused quartz; aluminosillcate; polymethylmethacrylate polystyrene; acrylic; or arsenic trioxide.

3. A multicore optical fiber according to claim 1, wherein:
   the non-photosensitive material of the first optical fiber core has an initial crystallinity; and
   the plurality of index-altered portions have an altered crystallinity which is less ordered than the initial crystallinity of the non-photosensitive material.

4. A multicore optical fiber according to claim 1, further comprising:
   a cladding layer surrounding the first optical fiber core and the second optical fiber core, the cladding layer having a cladding index of refraction which is less than the initial index of refraction of the first optical fiber core;
   wherein;
   the first optical fiber core has a circular cylindrical shape and a core radius; and
   the second optical fiber core is formed of the non-photosensitive material and has the circular cylindrical shape and the core radius.

5. A multicore optical fiber according to claim 4, wherein:
   the cladding layer has an elliptical cylindrical shape, a first longitudinal focal axis, and a second longitudinal focal axis;
   the first longitudinal axis of the first optical fiber core and the first longitudinal focal axis of the cladding layer are collinear; and
   the second longitudinal axis of the second optical fiber core and the second longitudinal focal axis of the cladding layer are collinear.

6. A multicore optical fiber according to claim 4, wherein the second optical fiber core includes another plurality of index-altered portions having the altered index of refraction arranged within the non-photosensitive material of the second optical fiber core to form another diffractive structure.

7. A multicore optical fiber according to claim 1, wherein the second optical fiber core is a single mode optical fiber core.

8. A multicore optical fiber according to claim 1, wherein the diffractive structure formed in the first optical fiber core is a photonic crystal structure.

9. A multicore optical fiber according to claim 8, wherein the photonic crystal structure formed in the first optical fiber core includes a defect.

10. A multicore optical fiber according to claim 1, wherein:
each of the plurality of index-altered portions of the first optical fiber core has a first transmission surface, a second transmission surface substantially parallel to the first transmission surface, and a longitudinal thickness;
the plurality of index-altered portions are arranged within the non-photosensitive material of the first optical fiber core with a longitudinal pitch such that the first transmission surface of one portion of the plurality of index-altered portions is substantially parallel to the second transmission surface of a neighboring portion of the plurality of index-altered portions; and
the diffractive structure formed in the first optical fiber core is a Bragg grating structure for a predetermined wavelength band.

11. A multicore optical fiber with an integral diffractive element, comprising:
a first optical fiber core formed of a non-photosensitive material having an initial index of refraction, the first optical fiber core including;
a first longitudinal core axis;
a plurality of index-altered portions along the first optical fiber core in a longitudinal direction and having an altered index of refraction different from the initial index of refraction; and
a second optical fiber core including a second longitudinal core axis substantially parallel to the first longitudinal axis;
wherein:
the plurality of index-altered portions are arranged within the non-photosensitive material of the first optical fiber core to form a diffractive structure; and
the first transmission surfaces and the second transmission surfaces of the plurality of index-altered portions are one of conic surfaces, spherical curved surfaces, or aspherical curved surfaces.

12. A multicore optical fiber according to claim 11, further comprising:
a cladding layer surrounding the first optical fiber core and the second optical fiber core, the cladding layer having a cladding index of refraction which is less than the initial index of refraction of the first optical fiber core;
wherein:
the first optical fiber core has a circular cylindrical shape and a core radius;
the second optical fiber core is formed of the non-photosensitive material and has the circular cylindrical shape and the core radius;
the second optical fiber core includes another plurality of index-altered portions having the altered index of refraction and another longitudinal thickness; and
the other plurality of index-altered portions are arranged within the non-photosensitive material of the second optical fiber core with another longitudinal pitch to form another Bragg grating structure.

13. A multicore optical fiber according to claim 12, wherein:
the plurality of index-altered portions of the first optical fiber core are sized and arranged to preferentially coupled to a first subband of wavelengths of the predetermined wavelength band; and
the other plurality of index-altered portions of the second optical fiber core are sized and arranged to preferentially couple to a second subband of wavelengths of the predetermined wavelength band.

14. A multicore optical fiber according to claim 11, wherein a shape of the plurality of index-altered portions varies between different index-altered portions in the longitudinal direction of the first optical fiber core such that the Bragg grating structure formed by the plurality of index-altered portions is an apodized Bragg grating structure.

15. A multicore optical fiber according to claim 10, wherein the longitudinal thickness and the longitudinal pitch selected such that the Bragg grating structure is a long period Bragg grating structure.

16. A multicore optical fiber according to claim 11, wherein the longitudinal pitch of the plurality of index-altered portions varies between different index-altered portions in the longitudinal direction of the first optical fiber core such that the Bragg grating structure formed by the plurality of index-altered portions is a chirped Bragg grating structure.

17. A multicore optical fiber according to claim 10, wherein:
the Bragg grating structure formed by the plurality of index-altered portions includes n subsets of index-altered portions;
each subset of index-altered portions being longitudinally aligned in a line parallel to the first longitudinal core axis of the first optical fiber core;
each index altered potion of a first subset of index-altered portions has a first longitudinal thickness and a first longitudinal pitch within the first optical fiber core selected such that a first portion of the Bragg grating structure formed by the first subset of index-altered portions is preferentially coupled to a first subband of wavelengths of the predetermined wavelength band; and
each index altered potion of a second subset of index-altered portions has a second longitudinal thickness and a second longitudinal pitch within the first optical fiber core selected such that a second portion of the Bragg grating structure formed by the second subset of index-altered portions is preferentially coupled to a second subband of wavelengths of the predetermined wavelength band which is different than the first subband of wavelengths.

18. A multicore optical fiber according to claim 1, wherein:
the first optical fiber core further includes;
a substantially planar end surface;
a coupling section adjacent to the substantially planar end surface;
a substantially cylindrical surface; and
a core radius;
the plurality of index-altered portions are arranged within the coupling section of the first optical fiber core; and
the diffractive structure formed in coupling section of the first optical fiber core includes at least one integral diffractive coupling optical element.

19. A multicore optical fiber according to claim 18, wherein:
the plurality of index-altered portions are a plurality of concentric annular portions centered on the longitudinal core axis of the optical fiber core; and
the plurality of concentric annular portions are one of;
a plurality of concentric circular annular portions sized and arranged such that the at least one integral diffractive coupling optical element formed in the coupling section of the first optical fiber core includes a circular two dimensional diffractive optical lens; or
a plurality of concentric elliptical annular portions sized and arranged such that the at least one integral diffractive coupling optical element formed in the coupling section of the first optical fiber core includes an elliptical two dimensional diffractive optical lens.

20. A multicore optical fiber according to claim 18, wherein:
the plurality of index-altered portions are a plurality of parallel lines perpendicular to the longitudinal core axis of the optical fiber core;
the plurality of parallel lines are sized and arranged such that the at least one integral diffractive coupling optical element formed in the coupling section of the first optical fiber core includes one of a one dimensional diffractive optical lens or a diffractive grating.

21. A wavelength stabilized, high power, uncooled laser source, comprising:
at least one high power laser; and
a multicore optical fiber optically coupled to the at least one high power laser, the multicore optical fiber including;
a first optical fiber core formed of a non-photosensitive material having a first index of refraction, the first optical fiber core including;
a first longitudinal core axis;
a circular cylindrical shape;
a first core radius;
a Bragg grating section that includes a first plurality of index-altered portions having an altered index of refraction different from the first index of refraction;
a laser coupling surface normal to the first longitudinal core axis optically coupled to the at least one high power laser; and
a coupling section adjacent to the laser coupling surface with a second plurality of index-altered portions, the second plurality of index-altered portions being arranged within the coupling section to form an integral diffractive coupling optics structure; and
a second optical fiber core having a second index of refraction which is less than the first index of refraction of the first optical fiber core, the second optical fiber core including;
a second longitudinal core axis substantially collinear with the first longitudinal axis;
an annular cylindrical shape;
an inner second core radius equal to the first core radius of the first optical fiber core; and
an outer second core radius;
wherein the first plurality of index-altered portions are arranged within the non-photosensitive material of the first optical fiber core to form a Bragg grating structure for reflecting a predetermined fraction of light in a predetermined wavelength band propagating in the first optical fiber core back into the at least one high power laser to lock an output wavelength band of the wavelength stabilized, high power, uncooled laser source to the predetermined wavelength band.

22. A wavelength stabilized, high power, uncooled laser source according to claim 21, wherein:
the first optical fiber core is a single mode optical fiber core; and
each of the first plurality of index-altered portions has a cylindrical shape and an index-altered portion radius substantially equal to the first core radius of the first optical fiber core.

23. A wavelength stabilized, high power, uncooled laser source according to claim 21, wherein:
the first optical fiber core is a multimode optical fiber core; and
the first plurality of index-altered portions are sized and shaped to preferentially couple the Bragg grating structure to a subset of transverse modes of the first optical fiber core.

24. A wavelength stabilized, high power, uncooled laser source according to claim 21, wherein the Bragg grating structure is a long period Bragg grating structure.

25. A wavelength stabilized, high power, uncooled laser source according to claim 21, wherein the at least one high power laser is a continuous wave semiconductor laser.

26. A wavelength stabilized, high power, uncooled laser source according to claim 21, wherein the at least one high power laser and the muiticore optical fiber are substantially thermally uncoupled.

27. A wavelength stabilized, high power, uncooled laser source according to claim 21, wherein the non-photosensitive material of the first optical fiber core has a coefficient of thermal expansion sufficiently low that the predetermined wavelength band reflected by the Bragg grating structure is substantially constant.

28. A wavelength stabilized, high power, uncooled laser source according to claim 21, wherein the first optical fiber core of the multicore optical fiber includes a thermal buffering section extending between the laser coupling surface and the Bragg grating section to reduce heating of the Bragg grating section by the at least one high power laser during operation.

29. A wavelength stabilized, high power, uncooled laser source according to claim 21, wherein the first optical fiber core of the multicore optical fiber further includes:
an output surface normal to the first longitudinal core axis for transmitting output laser light from the wavelength stabilized, high power, uncooled laser source; and
an output section adjacent to the output surface with a further plurality of index-altered portions, the further plurality of index-altered portions being arranged within the output section to form an integral diffractive output optics structure.

30. A multicore optical fiber according to claim 11, wherein the non-photosensitive material of the first optical fiber core includes at least one of: fused silica; borosilicate quartz; zirconium fluoride; silver halide; chalcogenide glass; optical plastic; clear fused quartz; aluminosilicate; polymethylmeth-acrylate; polystyrene; acrylic; or arsenic trioxide.

31. A multicore optical fiber according to claim 11, wherein:
the non-photosensitive material of the first optical fiber core has an initial crystalilnity; and
the plurality of index-altered portions have an altered crystallinity which is less ordered than the initial crystallinity of the non-photosensitive material.

* * * * *

UNITED STATES PATENT AND TRADEMARK OFFICE
CERTIFICATE OF CORRECTION

PATENT NO. : 7,587,110 B2  Page 1 of 1
APPLICATION NO. : 11/086890
DATED : September 8, 2009
INVENTOR(S) : Rajiminder Singh et al.

It is certified that error appears in the above-identified patent and that said Letters Patent is hereby corrected as shown below:

Column 20, line 23 "potion" should be --portion--

Signed and Sealed this

Sixth Day of April, 2010

David J. Kappos
*Director of the United States Patent and Trademark Office*